(12) United States Patent  
Kikuchi et al.

(10) Patent No.: US 8,882,326 B2  
(45) Date of Patent: *Nov. 11, 2014

(54) LIGHT GUIDE PLATE AND SURFACE LIGHT SOURCE DEVICE

(71) Applicant: Panasonic Corporation, Osaka (JP)

(72) Inventors: Takanori Kikuchi, Osaka (JP); Masami Ito, Osaka (JP); Masaru Fujita, Osaka (JP); Yusuke Kusaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,181

(22) Filed: Jun. 25, 2013

(65) Prior Publication Data

US 2013/0343082 A1 Dec. 26, 2013

(30) Foreign Application Priority Data

Jun. 25, 2012 (JP) ................................. 2012-141879

(51) Int. Cl.
*F21V 8/00* (2006.01)
(52) U.S. Cl.
CPC .................................... *G02B 6/0068* (2013.01)
USPC ............................. 362/626; 362/607; 349/62
(58) Field of Classification Search
USPC ............................. 362/607, 609, 499; 349/62
See application file for complete search history.

(56) References Cited

U.S. PATENT DOCUMENTS

| 5,999,685 | A | 12/1999 | Goto et al. | |
| 6,280,063 | B1 * | 8/2001 | Fong et al. | 362/333 |
| 7,431,491 | B2 | 10/2008 | Liao | |
| 2003/0174492 | A1 * | 9/2003 | Ohkawa | 362/31 |
| 2004/0264911 | A1 * | 12/2004 | Toeda et al. | 385/146 |
| 2007/0279551 | A1 * | 12/2007 | Umebayashi | 349/65 |
| 2009/0180297 | A1 | 7/2009 | Shim et al. | |
| 2013/0335999 | A1 * | 12/2013 | Doyle et al. | 362/607 |

OTHER PUBLICATIONS

Office Action issued Jun. 9, 2014 in U.S. Appl. No. 13/540,978.

* cited by examiner

*Primary Examiner* — Tracie Y Green
(74) *Attorney, Agent, or Firm* — Wenderoth, Lind & Ponack, L.L.P.

(57) ABSTRACT

A light guide plate includes an incident surface on which light outputted from point light sources is incident and an outgoing surface for outputting light incident from the incident surface, wherein a reflection-and-propagation surface for reflecting light toward the outgoing surface is formed in a back surface opposite to the outgoing surface. The outgoing surface is made up of a propagation region adjacent to the incident surface, a diffusion-and-propagation auxiliary region adjacent to the propagation region, and a diffusion-and-propagation region adjacent to the diffusion-and-propagation auxiliary region. Hot spots and bright/dark lines in vicinities of the incident surface are controlled primarily by curved portions of prism upper ends formed in the diffusion-and-propagation region, and viewing-angle characteristics of the light guide plate are controlled primarily by linear portions of the prisms.

8 Claims, 34 Drawing Sheets

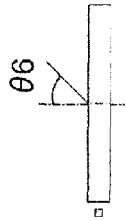

Fig.20

| OUTGOING SURFACE CONFIGURATION OF LIGHT GUIDE PLATE | LUMINANCE DISTRIBUTION ON LIGHT GUIDE PLATE IN VICINITIES OF LIGHT INPUT PART | LUMINANCE CHART OF CROSS SECTION IN VICINITIES OF LIGHT INPUT PART | PROPERTY | |
|---|---|---|---|---|
| | | | LIGHT NONUNIFORMITIES | SPLIT LIGHT-EMISSION PROPERTY |
| (A) A CASE WHERE PRISM PROTRUSION HAVING A UNIFORM LINEAR PORTION ARE FORMED | 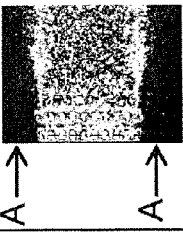 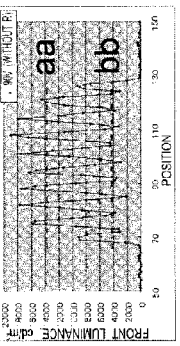 | 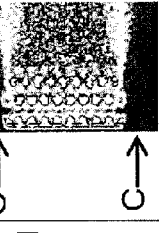 | × | ◎ |
| (B) A CASE WHERE THE RATIO OF LINEAR PORTION LENGTH TO CURVED PORTION LENGTH IN EACH PRISM OF OUTGOING SURFACE IS SET TO 1:0.6 |   | 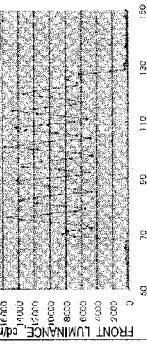 | ○ | ○ |
| (C) A CASE WHERE THE RATIO OF LINEAR PORTION LENGTH TO CURVED PORTION LENGTH IN EACH PRISM OF OUTGOING SURFACE IS SET TO 1:0.3 | 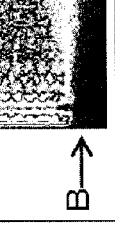  |  | ○ | ○ |
| (D) A CASE WHERE THE RATIO OF LINEAR PORTION LENGTH TO CURVED PORTION LENGTH IN EACH PRISM OF OUTGOING SURFACE IS SET TO 1:1 |   |  | ○ | ○ |

LIGHT GUIDE PLATE AND SURFACE LIGHT SOURCE DEVICE

BACKGROUND OF THE INVENTION

1. Field of the Invention

The present invention relates chiefly to a surface light source device to be used in backlight units of liquid crystal display panels or the like.

2. Description of the Related Art

In recent years, liquid crystal display devices have been rapidly expanding in application range by virtue of their features such as light weight, thin thickness and low power consumption drive. Liquid crystal display devices, which are not self light-emitting devices, generally need a separate light source such as a backlight. A backlight unit is composed mainly of a light source and a light guide plate for guiding light outputted from the light source to provide surface emission.

Generally, backlight units can be classified into direct type, edge light type, or the like depending on the position of the light source. With a direct type backlight unit, a multiplicity of light sources, e.g. cold-cathode tubes or LEDs (Light Emitting Diodes), are provided directly under the light guide plate so that light incoming from the light sources is diffused at the light guide plate so as to be applied to a liquid crystal display panel via a plurality of optical sheets. With an edge-light type backlight unit, a light source is provided at a side end of a light guide plate so that light incident from the light source is diffused at the light guide plate so as to be applied to a liquid crystal display panel via a plurality of optical sheets.

FIG. 34 shows an example of an edge-light type backlight unit in which LEDs are adopted. As shown in FIG. 34, a plurality of LEDs 106 serving as point light sources are placed in a side face of the light guide plate 101. Also, a diffusion sheet 102 is placed above the light guide plate 101, and the diffusion sheet 102 widely diffuses light outputted from the light guide plate 101. Further, a prism sheet 103 is placed above the diffusion sheet 102, a prism sheet 104 is placed above the prism sheet 103, and an optical sheet 105 is placed above the prism sheet 104. Thus, the prism sheets 103, 104 and the optical sheet 105 individually act to converge light into visual directions so that higher luminance can be achieved.

For material of the light guide plate 101, transparent resin panels or the like are used conventionally. The light guide plate 101 has an incident surface at a side face between an outgoing surface and a bottom face opposed to the outgoing surface, the incident surface having a primary light source such as a cold-cathode tube or point light sources given by a plurality of arrayed LEDs 106. Also, scattered dots are printed on the bottom face of the light guide plate 101, so that luminance distributions in the visual directions are controlled so as to be uniformized by adjusting size, density or the like of the dots. With such an arrangement, light outputted from the primary light source becomes incident on the light guide plate 101 via the incident surface, passing through inside of the light guide plate 101 and outputted from the outgoing surface toward the liquid crystal display part. However, due to an influence of the scattered dots in the bottom face of the light guide plate 101, light immediately after being outputted from the light guide plate 101 has an orientation distribution spreading to a wide angle, making it difficult to direct the light toward the visual directions.

Therefore, two prism sheets 103, 104 parallel to each other as well as an optical sheet 105 are used in order to converge the light outputted from the light guide plate 101 to the visual directions for higher luminance. However, with such an arrangement, the prism sheet, which is high priced, needs to be used two in number, causing an increase in the number of component parts of the unit so that the assembly becomes complicated as a problem.

Accordingly, in order to solve the above problems, there have been made many proposals for directing the light outputted from the outgoing surface toward the visual directions by forming prisms in the outgoing surface or bottom face or the like of the light guide plate. However, placement of prisms in regular array causes hot spots (light-gathering portions, luminous spots) or bright/dark lines to occur in vicinities of the incident surface, with the result that the uniformity of outgoing light is impaired. Also, the placement interval of LEDs has been increasing, as compared with conventional ones, together with increasing brightness per LED chip, resulting in more influences of the directivity of LEDs.

For solution of the above problems, there has been made a proposal for improving the hot spots and bright/dark lines by using a plurality of prisms in the shape of the outgoing surface (see, e.g., Document 1 (U.S. Pat. No. 7,431,491)).

FIGS. 35 and 36 show an outgoing surface shape of a light guide plate 22 described in Document 1.

FIG. 35 is a perspective view of the light guide plate 22 in Embodiment 1 of Document 1. The light guide plate 22 has an incident surface 221 for a light source, and an outgoing surface 223 adjacent to the incident surface 221. The outgoing surface 223 is composed of a first region 223A adjacent to the incident surface 221, and a second region 223B adjacent to the first region 223A at a position different from that for the incident surface 221.

FIG. 36 is a top view of the light guide plate 22 shown in FIG. 35. A boundary between the first region 223A and the second region 223B is assumed as an imaginary borderline III-III parallel to the incident surface 221.

As shown in FIGS. 35 and 36, in the second region 223B of the outgoing surface 223, a plurality of elongate prism lenses 225 are formed so as to extend along a direction orthogonal to the incident surface 221. Further, in the first region 223A of the outgoing surface 223, a plurality of elongate tetrahedral lenses 226 are formed in regular placement.

FIG. 37 is a sectional view taken along the line III-III of FIG. 36. The prism lenses 225, each made from a V-shaped protrusion, are placed in array all over the second region 223B. As shown in FIG. 37, each V-shaped protrusion of the prism lenses 225 has a triangular cross section. As shown in FIG. 37, according to Embodiment 1 of Document 1, an apex angle $\theta 1$ of each triangular cross section is set to about 175° or less. A length $P_L$ of a lower end of each triangular cross section is set to about 2.0 mm or less, and a height H of each triangular cross section of the individual prism lenses 225 is also set to about 2.0 mm or less.

Referring to FIG. 36, the tetrahedral lenses 226 are arrayed in correspondence to the prism lenses 225 along a direction parallel to the incident surface 221. Each tetrahedral lens 226 has a first side face 2261 facing a prism lens 225, mutually opposed second side face 2263 and third side face 2265, and a bottom face (not shown). The first side face 2261 is located at the borderline III-III of FIG. 36. Also as shown in FIG. 36, the first side face 2261 of the tetrahedral lenses 226 and a terminal end of the prism lenses 225 are interconnected with each other, respectively, at the borderline III-III so that the tetrahedral lenses 226 and the prism lenses 225 are connected to each other, correspondingly and respectively. As a result, in correspondence to the apex angle $\theta 1$ (FIG. 37) of each triangular cross section of the prism lenses 225, the apex angle of each first side face 2261 is also set to about 175° or less.

Besides, the length of the lower end of each first side face 2261 is set to about 2.0 mm or less, and the height H of each first side face 2261 is also set to 2.0 mm or less.

FIG. 38 is a cross section taken along the line IV-IV of FIG. 36. As shown in FIG. 38, a ridge defined by the second side face 2263 and the third side face 2265 of each tetrahedral lens 226 extends from the incident surface 221 so as to form an angle θ2 with reference to a direction parallel to the outgoing surface 223. According to Embodiment 1 of Document 1, the angle θ2 is set to about 85° or less.

Document 1 proposes that adopting the above-described structure makes it possible to suppress hot spots or bright/dark lines occurring in the outgoing surface 223.

SUMMARY OF THE INVENTION

However, with the above-described structure of Document 1, since each prism (tetrahedral lens 226) is made up from regions of the outgoing surface 223 adjacent to the incident surface 221, widened placement intervals of LEDs would cause bright/dark portions to occur in portions of the outgoing surface 223 in vicinities of the incident surface 221 due to influences of the directivity of the LEDs. Besides, setting outer dimensions of the light guide plate 22 equal to the effective light-emission area would cause the light guide plate 22 to be expanded and contracted by influences of heat of the LEDs, so that it may become impossible to output light stably from the effective light-emission area. Therefore, it is desirable that the outer dimensions of the light guide plate 22 be larger than the effective light-emission area. In such a case, with the prism shapes present outside the effective light-emission area, light that is originally not intended for use in the liquid crystal display device would be outputted to the outgoing surface 223 in the prism shape regions. As a result, use efficiency of light would lower, involving more than necessary power consumption.

Also, with the structure of FIG. 35, light spreading in portions of the outgoing surface 223 in vicinities of the incident surface 221 becomes larger, so that scrolling light emission of the liquid crystal screen causes light to leak to unnecessary places. Such light is seen as an afterimage in the screen so as to deteriorate the screen quality, leading to an impairment of the split light-emission property. Besides, in cases where a plurality of different prisms are formed in the outgoing surface 223, indeed nonuniformities of light are solved in specific angular directions in the outgoing surface 223, yet it can occur that the nonuniformities are not solved in other directions due to the directivity of the prisms.

Accordingly, an object of the present invention, lying in solving the above-described problems, is to provide a light guide plate capable of suppressing the occurrence of hot spots and bright/dark lines without impairing the split light-emission property.

In order to achieve the above object, the present invention has the following constitutions.

According to a first aspect of the present invention, there is provided a light guide plate comprising: an incident surface on which light outputted from a plurality of point light sources is incident; an outgoing surface from which light incident from the incident surface is outputted; and a reflection-and-propagation surface at which the light incident from the incident surface is reflected so as to be propagated toward the outgoing surface, the reflection-and-propagation surface being opposed to the outgoing surface, wherein
 a plurality of prism grooves extending parallel to the incident surface are formed in the reflection-and-propagation surface,
 a flat surface portion is formed in a propagation region of the outgoing surface adjacent to the incident surface, and
 a plurality of prism protrusions extending orthogonal to the incident surface are formed in a diffusion-and-propagation region of the outgoing surface adjacent to the propagation region, each of the prism protrusions including a protrusion having a curved portion at its upper end.

According to a second aspect of the invention, there is provided a light guide plate according to the first aspect, wherein the prism protrusions include a first prism protrusion in which an upper end of a protrusion cross section parallel to the incident surface is formed from a curved portion, and a second prism protrusion in which an upper end of a protrusion cross section parallel to the incident surface is formed from a linear portion.

According to a third aspect of the invention, there is provided a light guide plate according to the first aspect, wherein a cross section of the prism protrusions parallel to the incident surface is projecting-shaped, and
 a ratio of a length of a linear portion to a length of the curved portion in the projecting shape satisfies a relationship $$0.3 \leq (\text{length of curved portion})/(\text{length of linear portion}) \leq 1.0.$$

According to a fourth aspect of the invention, there is provided a light guide plate according to the first aspect, wherein height of the prism protrusions formed in the reflection-and-propagation surface keeps constant or continuously increases from the incident surface toward a center of the light guide plate.

According to a fifth aspect of the invention, there is provided a light guide plate according to the first aspect, wherein each prism ridge of the prism protrusions is formed by a curved line including a straight line.

According to a sixth aspect of the invention, there is provided a light guide plate according to the first aspect, wherein the prism grooves are formed so as to have a maximum groove depth at a center of the light guide plate and become continuously shallower toward the incident surface among each other.

According to a seventh aspect of the invention, there is provided a backlight unit including the light guide plate according to the first aspect, and a plurality of point light sources.

According to an eighth aspect of the invention, there is provided a surface light source device comprising: the light guide plate according to the first aspect; at least one diffusion sheet; at least one prism sheet; a plurality of optical sheets for controlling light derived from the light guide plate; a reflecting sheet provided on one side of the light guide plate counter to the diffusion sheet and serving for reflecting light toward the outgoing surface; and an LED.

As described above, according to the light guide plate of the invention, it becomes implementable to suppress hot spots and bright/dark lines without impairing the split light-emission property.

BRIEF DESCRIPTION OF THE DRAWINGS

These aspects and features of the present invention will become clear from the following description taken in conjunction with the preferred embodiments thereof with reference to the accompanying drawings, in which:

FIG. 19 is a luminance distribution comparison view between a case where both presence and absence portions of prism protrusions are included in the effective light-emission area of an outgoing surface 611 and another case where uniform prism protrusions each having a certain ratio of a curved portion are formed all over the effective light-emission area of an outgoing surface 11;

FIG. 20 is a luminance-distribution and luminance-chart comparison view in a light-input part neighborhood cross section depending on differences in the outgoing-surface shape of the light guide plate according to Embodiment 1 of the invention;

DETAILED DESCRIPTION OF THE INVENTION

Hereinbelow, embodiments of the present invention will be described with reference to the accompanying drawings.

Embodiment 1

Figure 1:
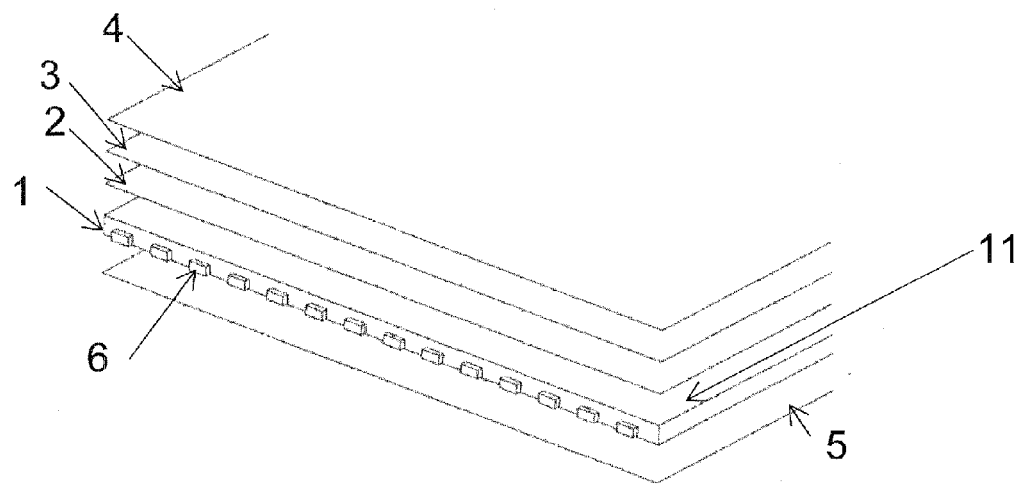
FIG. 1 is a schematic view of a surface light source device according to Embodiment 1 of the invention.

Embodiment 1 of the invention is described with reference to FIGS. 1 to 21. FIG. 1 is a schematic view showing a surface light source device according to Embodiment 1. As shown in FIG. 1, the surface light source device includes a light guide plate 1, a diffusion sheet 2, a prism sheet 3, an optical sheet 4, a reflecting sheet 5, and LEDs 6. The light guide plate 1 is formed from a transparent resin (e.g., acrylic resin or polycarbonate) or the like. The diffusion sheet 2 for diffusing light outputted from the upper surface of the light guide plate 1 is provided above the light guide plate 1. The diffusion sheet 2 may be made up by dispersing materials of different refractive index inside a sheet of transparent resin or the like, or by dispersing a transparent spherical-shaped material on a transparent sheet, or by forming depressions and projections on a surface of a transparent sheet.

With an aim of achieving higher luminance by converging light outputted from the diffusion sheet 2 to visual directions, a prism sheet 3 (directional sheet) is provided above the diffusion sheet 2, and for even higher luminance, an optical sheet 4 is provided above the prism sheet 3.

The reflecting sheet 5 is placed under a lower surface of the light guide plate 1 so as to cover later-described point-light-source LEDs 6, so that the light is reflected toward an outgoing surface 11 of the light guide plate 1. The reflecting sheet 5 is made up, for example, by densely dispersing foam of several μm to several tens of μm inside a transparent resin sheet, or by depositing silver, aluminum or other high-reflectivity material on a resin sheet, metal plate or the like.

The LEDs 6, which are point light sources, are provided as shown in FIG. 1 so as to be arrayed each in plurality in vicinities of shorter-side side faces of the light guide plate 1. The LEDs 6 counting, for example, 72 pieces on one side and 144 pieces on the two sides may be placed. Also, a thickness-wise center of the light guide plate 1 and a thicknesswise center of the LEDs 6 are coincident with each other.

(Details of the Light Guide Plate 1)

Next, details of the configuration of the light guide plate 1 are described with reference to FIGS. 2 to 18.

Figure 2:
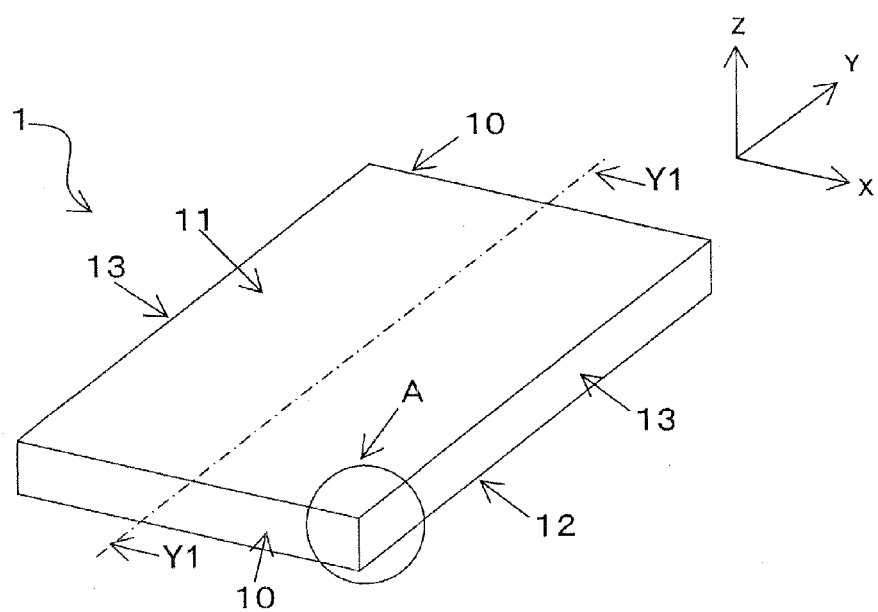
FIG. 2 is a perspective view of a light guide plate according to Embodiment 1 of the invention.

FIG. 2 shows an appearance of the light guide plate 1. As shown in FIG. 2, the light guide plate 1 is formed into a generally rectangular parallelepiped shape and includes an incident surface 10 on which light outputted from the LEDs 6 shown in FIG. 1 comes incident, an outgoing surface 11 from which light incident from the incident surface 10 is outputted, a reflection-and-propagation surface 12 facing the outgoing surface 11 and serving for propagating and reflecting light coming incident from the incident surface 10 toward the outgoing surface 11, and side faces 13 adjacent to these surfaces. All of these surfaces are finished to optical flat surfaces. As shown in FIG. 2, it is assumed that a direction parallel to the incident surface 10 and orthogonal to the side faces 13 is an X direction, a direction orthogonal to the incident surface 10 and parallel to the side faces 13 is a Y direction, and a direction parallel to the incident surface 10 and orthogonal to the outgoing surface 11 is a Z direction.

Figure 3:
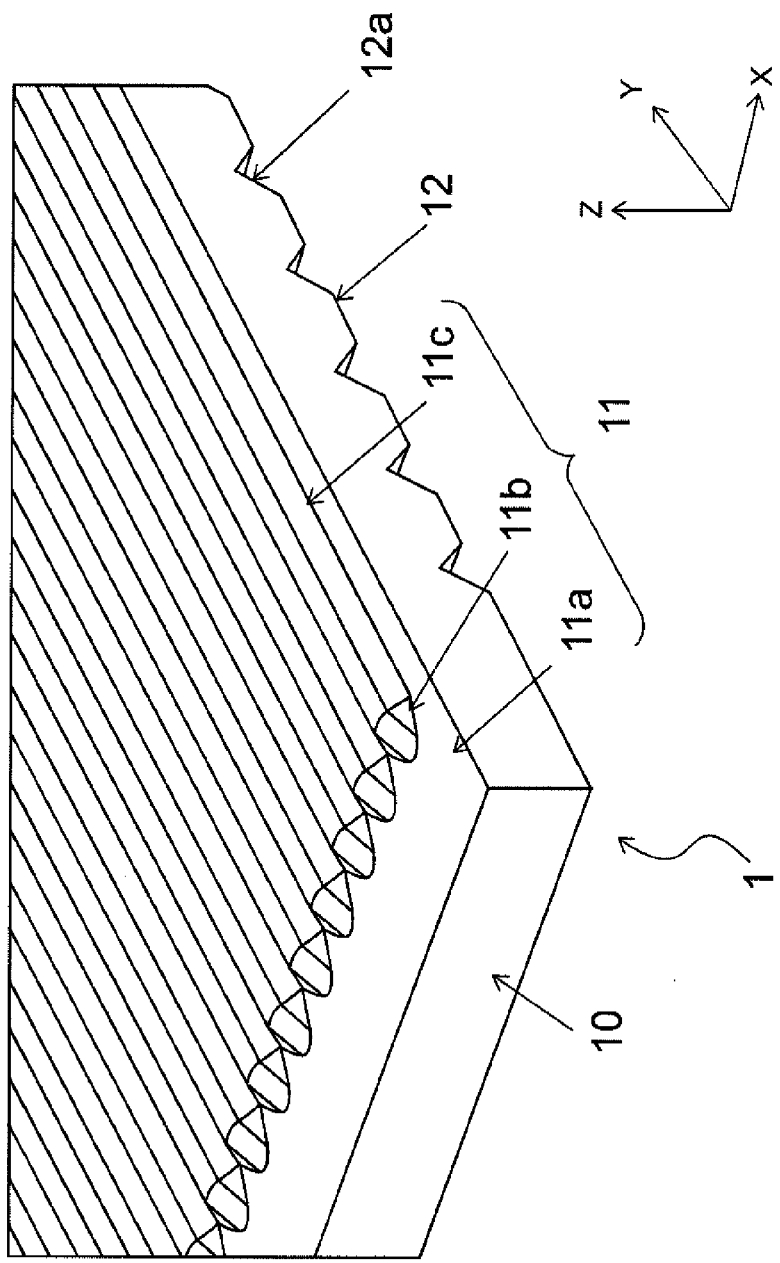
FIG. 3 is a perspective view of A part of the light guide plate according to Embodiment 1 of the invention.

Details of A part of FIG. 2 are explained by FIG. 3. As shown in FIG. 3, a plurality of prism grooves 12a extending in the X direction generally parallel to the incident surface 10 are placed in the reflection-and-propagation surface 12. A cross section of each prism groove 12a as viewed in a plane orthogonal to the incident surface 10 is generally V-shaped or generally trapezoidal-shaped. Also, the prism grooves 12a are so made as to become maximum in depth at a center of the light guide plate 1 and continuously shallower toward the incident surface 10 among each other. In Embodiment 1, the prism pitch is set to 500 μm, and the depth of the prism grooves 12a is defined as within a range of 4 μm to 70 μm. In addition, the prism shape, the prism pitch and the prism depth may be changed, as required, depending on such optical characteristics as luminance distribution and angle-of-visibility characteristic of the outgoing surface 11.

Figure 4:
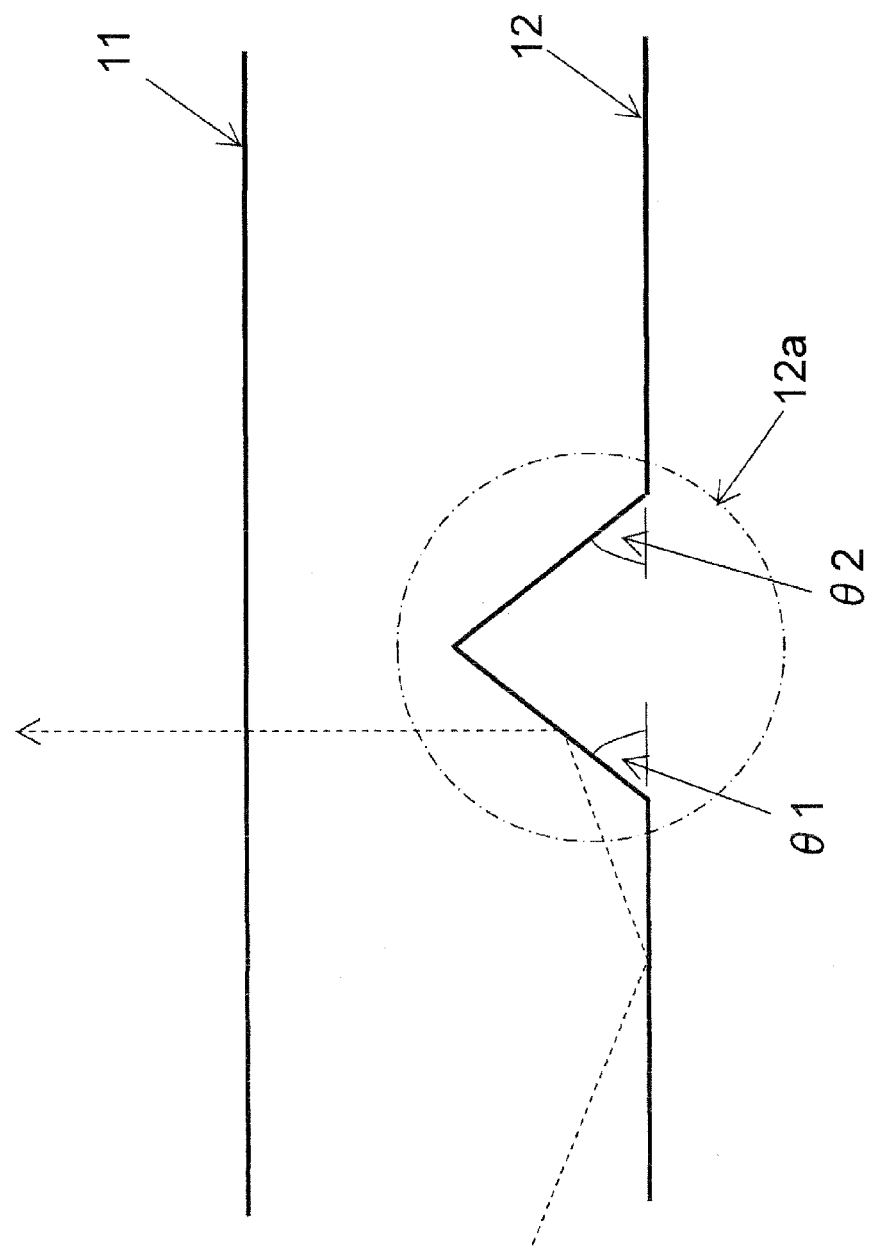
FIG. 4 is a sectional view of a reflection-and-propagation surface of the light guide plate according to Embodiment 1 of the invention.

FIG. 4 shows a schematic optical path diagram in the reflection-and-propagation surface 12. As shown in FIG. 4, providing the prism grooves 12a allows light to impinge on the prism grooves 12a and change in its reflection-and-propagation direction. Also, the prism grooves 12a are increased and decreased in depth (in the Y direction) as described above so that slopes formed on the prism grooves 12a are increased and decreased in area, thus making it possible to change the quantity of light propagated and reflected toward the outgoing surface 11 side. Further, changing the prism angles θ1, θ2 as required depending on necessary optical specifications makes it possible to change the outgoing angle of light at the outgoing surface 11.

Figure 5:
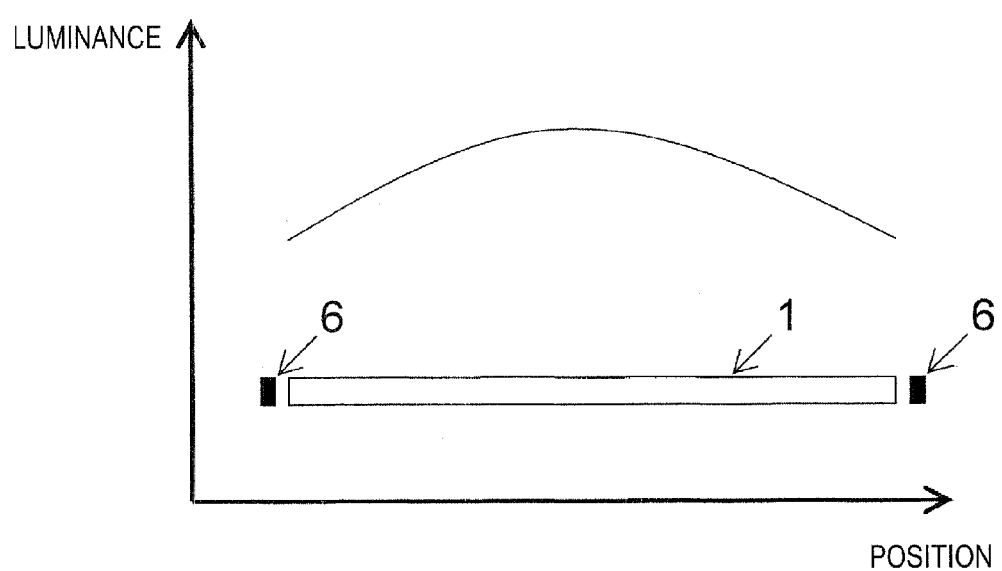
FIG. 5 is a luminance distribution chart of light outputted from a backlight unit at a Y1-Y1 cross section of the light guide plate according to Embodiment 1 of the invention.

FIG. 5 shows a luminance distribution of light outputted from a backlight unit in a cross section taken along the line Y1-Y1 of FIG. 2. Since the prism grooves 12a (FIG. 3) are set in depth so as to be deeper in central portion of the light guide plate 1 and shallower in vicinities of the incident surface 10, luminance is higher increasingly toward central portion of the light guide plate 1 as shown in FIG. 5. Thus, luminance distribution of the outgoing light can be changed by adjusting the shape of the prism grooves 12a.

As shown in FIG. 3, formed in the outgoing surface 11 are a propagation region 11a adjacent to the incident surface 10 and serving for propagating incident light while diffusing the light, a diffusion-and-propagation auxiliary region 11b adjacent to the propagation region 11a in the Y direction and serving for propagating propagated light while diffusing the light, and a diffusion-and-propagation region 11c adjacent to the diffusion-and-propagation auxiliary region 11b in the Y direction and serving for propagating propagated light while diffusing the light.

The propagation region 11a is a flat surface having no prism protrusions and finished to an optical plane, its surface roughness being defined as Rt=0.03 or less. At the propagation region 11a, in which no prism protrusions are present, most light is totally reflected, propagating to the diffusion-and-propagation auxiliary region 11b and the diffusion-and-propagation region 11c. Thus, the quantity of outgoing light in visual directions relative to the quantity of incident light becomes smaller in the propagation region 11a. Therefore, the quantity of outgoing light in the visual directions is generally defined by two regions (the diffusion-and-propagation auxiliary region 11b and the diffusion-and-propagation region 11c) excluding the propagation region 11a.

Figure 6:
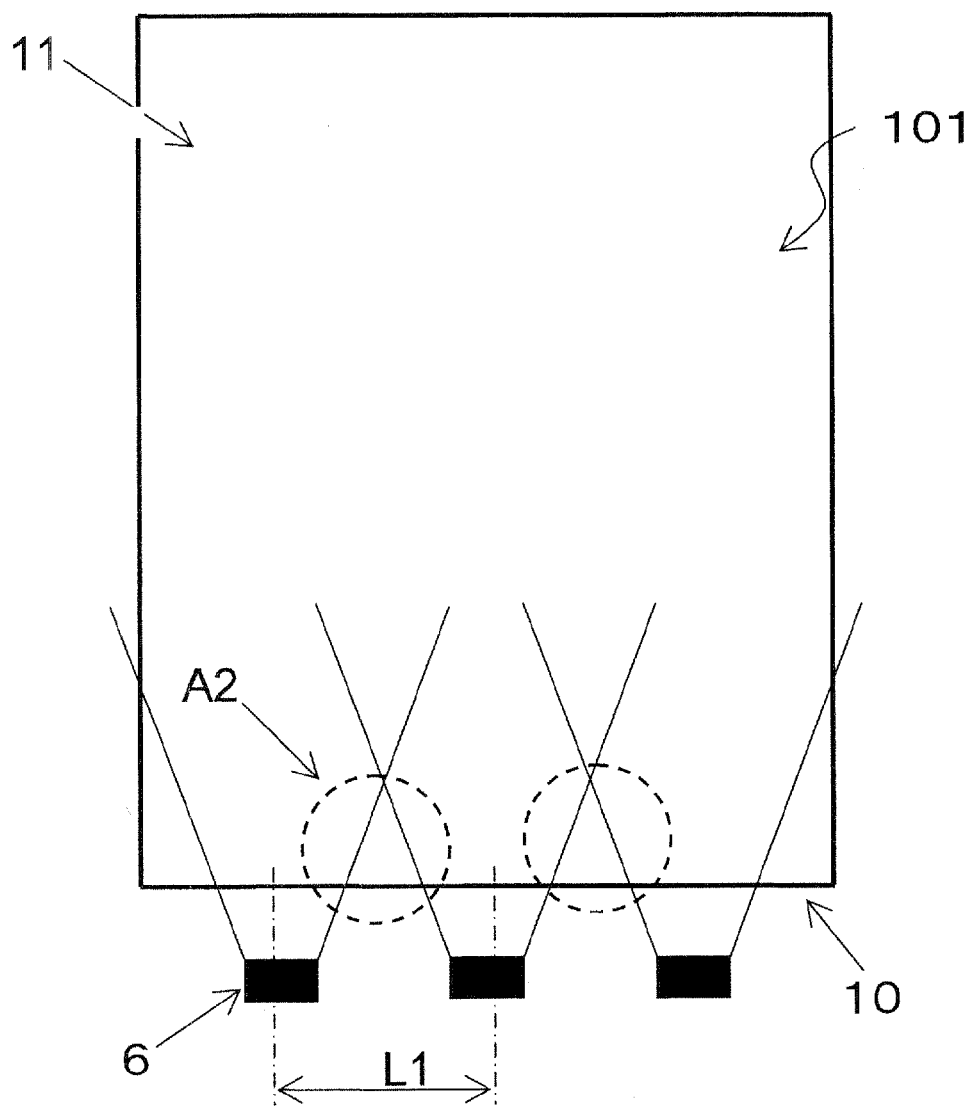
FIG. 6 is an outline view of dark-portion occurrence places occurring due to widening of the LED placement pitch in a general light guide plate.

Now an outline view of dark-portion occurrence places occurring due to widening of the LED placement pitch in a conventional light guide plate is shown in FIG. 6. As shown in FIG. 6, a widened placement interval of the LEDs 6 (LED placement pitch) causes dark portions A2 to more easily occur in vicinities of the incident surface 10 in the outgoing surface 11 of the light guide plate 101.

In this Embodiment 1, for prevention of such occurrence of dark portions A2, the propagation region 11a is provided adjacent to the incident surface 10 in the outgoing surface 11 shown in FIG. 3. By the provision of the propagation region 11a, dark portions occurring depending on LED placement positions and directional characteristics can be converged within the propagation region 11a, which is outside the effective light-emission area. Further, the effective light-emission area (diffusion-and-propagation region 11c in this Embodiment 1) can be prevented from effects of expansion and contraction of the light guide plate 1 due to heat from the light sources.

Figure 7:
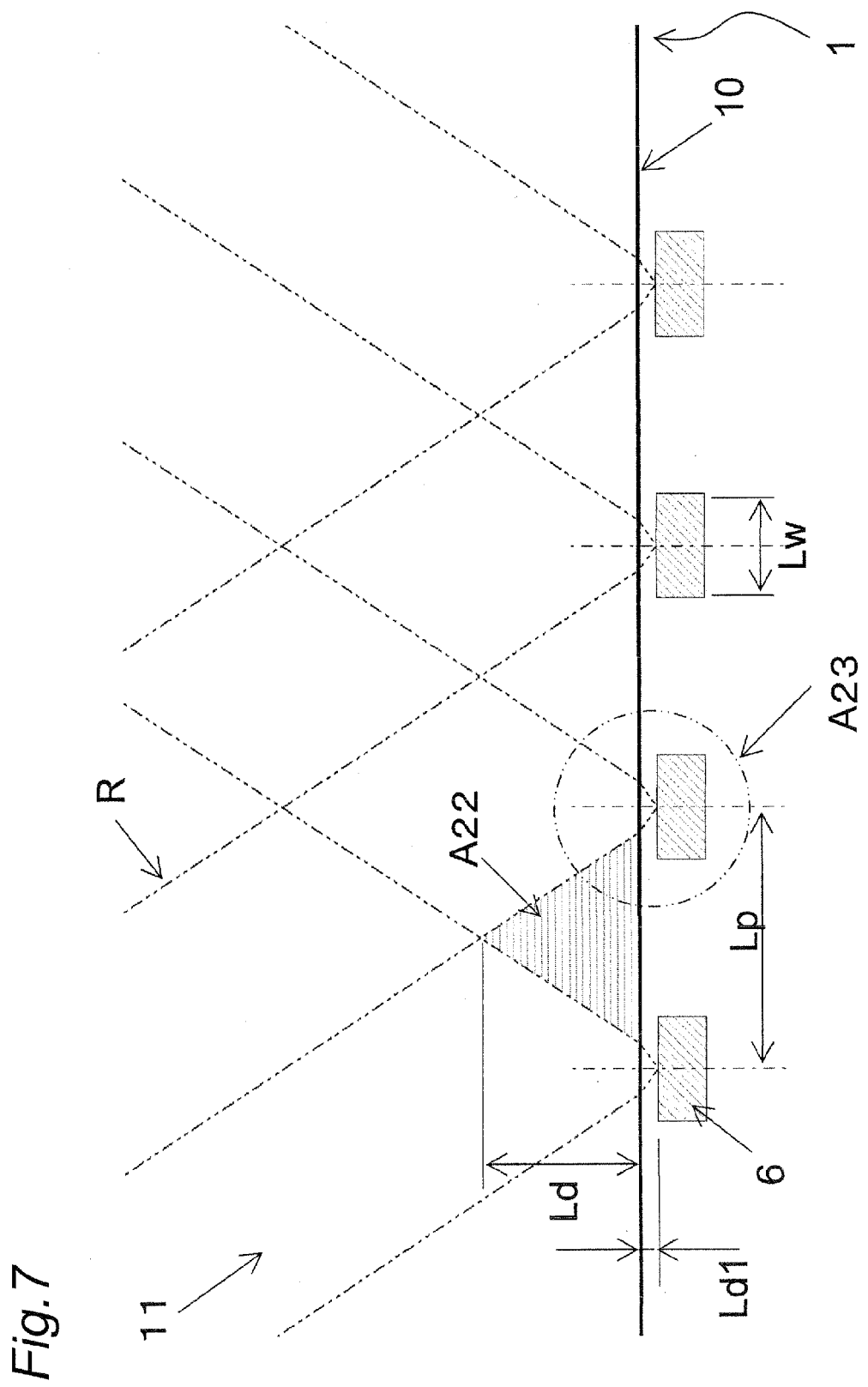
FIG. 7 is a top view of vicinities of the incident surface in the light guide plate, as viewed from the outgoing surface side.

Next, range setting for the propagation region 11a (FIG. 3) is explained in detail with reference to FIG. 7. FIG. 7 shows an optical path of light outputted from the LEDs 6, as a vicinity of the incident surface 10 in the light guide plate 1 is viewed from the outgoing surface 11 side. In FIG. 7, lines R represent rays of light outputted from half-value angles of the directional characteristics of the LEDs 6. It is noted here that a crossing portion A22, which is a region surrounded by the lines R and the incident surface 10 in the outgoing surface 11, is included in the dark portion A2 shown by FIG. 6 and occurs depending on LED placement positions and directional characteristics. As shown in FIG. 7, ranges of the crossing portion A22 and the dark portion A2 are changed depending on the LED placement pitch Lp, the width Lw of one LED alone, and the directivity of the LEDs.

Figure 8:
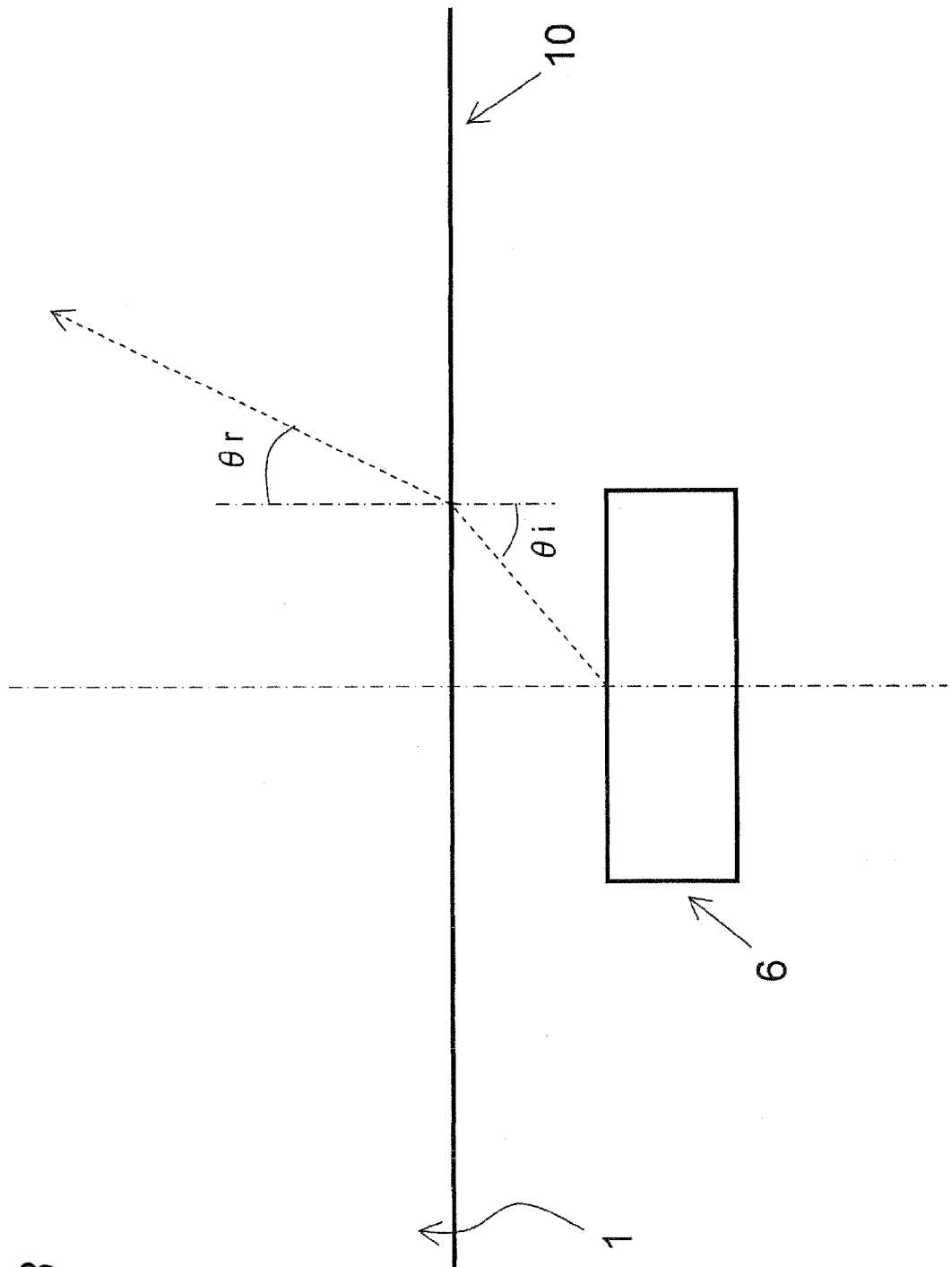
FIG. 8 is an enlarged detail view of A23 part.

FIG. 8 shows an enlarged detail view of A23 part of FIG. 7.

As shown in FIGS. 7 and 8, given an incident angle θi from an LED 6 to the light guide plate 1, a refractive angle θr, a refractive index n1 from the LED 6 to the light guide plate 1, a refractive index n2 in the light guide plate 1, a distance Ld1 from the LED 6 to the incident surface 10, and a distance (dark-portion occurrence distance) Ld from the incident surface 10 to the crossing portion A22, the following equation can be derived from Snell's law:

$$n1 \times \sin(\theta i) = n2 \times \sin(\theta r) \quad \text{(Eq. 1)}$$

Developing Equation 1 further leads to the following equation:

$$Ld = [Lp/2 - Ld1 \times \tan(\theta i)] \times \tan(90 - \theta r) \quad \text{(Eq. 2)}$$

As can be understood from Equation 2, the range of the propagation region 11a may appropriately be set by referencing the dark-portion occurrence distance Ld.

As shown in FIG. 3, prism protrusions are formed in the diffusion-and-propagation region 11c. The prism protrusions are so formed that when the light guide plate 1 is viewed from upward (in the Z direction), the prism protrusions extend in directions orthogonal to the incident surface 10 (in the Y direction) as well as in directions perpendicular to the prism grooves 12a formed in the reflection-and-propagation surface 12.

Figure 9:
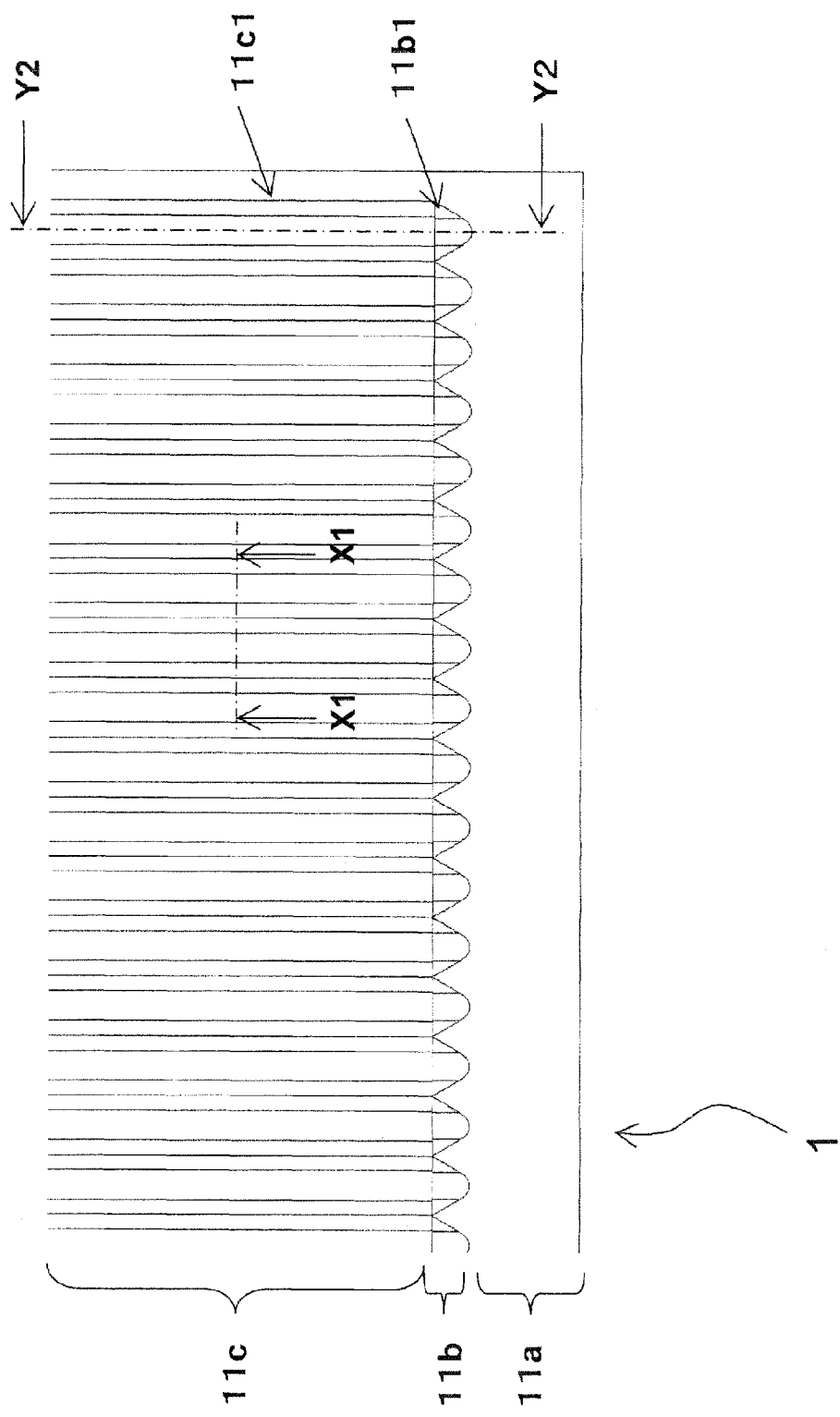
FIG. 9 is a top view of A part of the light guide plate according to Embodiment 1 of the invention.

FIG. 9 is a top view of the light guide plate 1 at A part of FIG. 2. As shown in FIG. 9, a prism ridge 11b1 formed in the diffusion-and-propagation auxiliary region 11b and a prism ridge 11c1 formed in the diffusion-and-propagation region 11c are connected to each other, by which a continuous ridge is formed.

Figure 10:
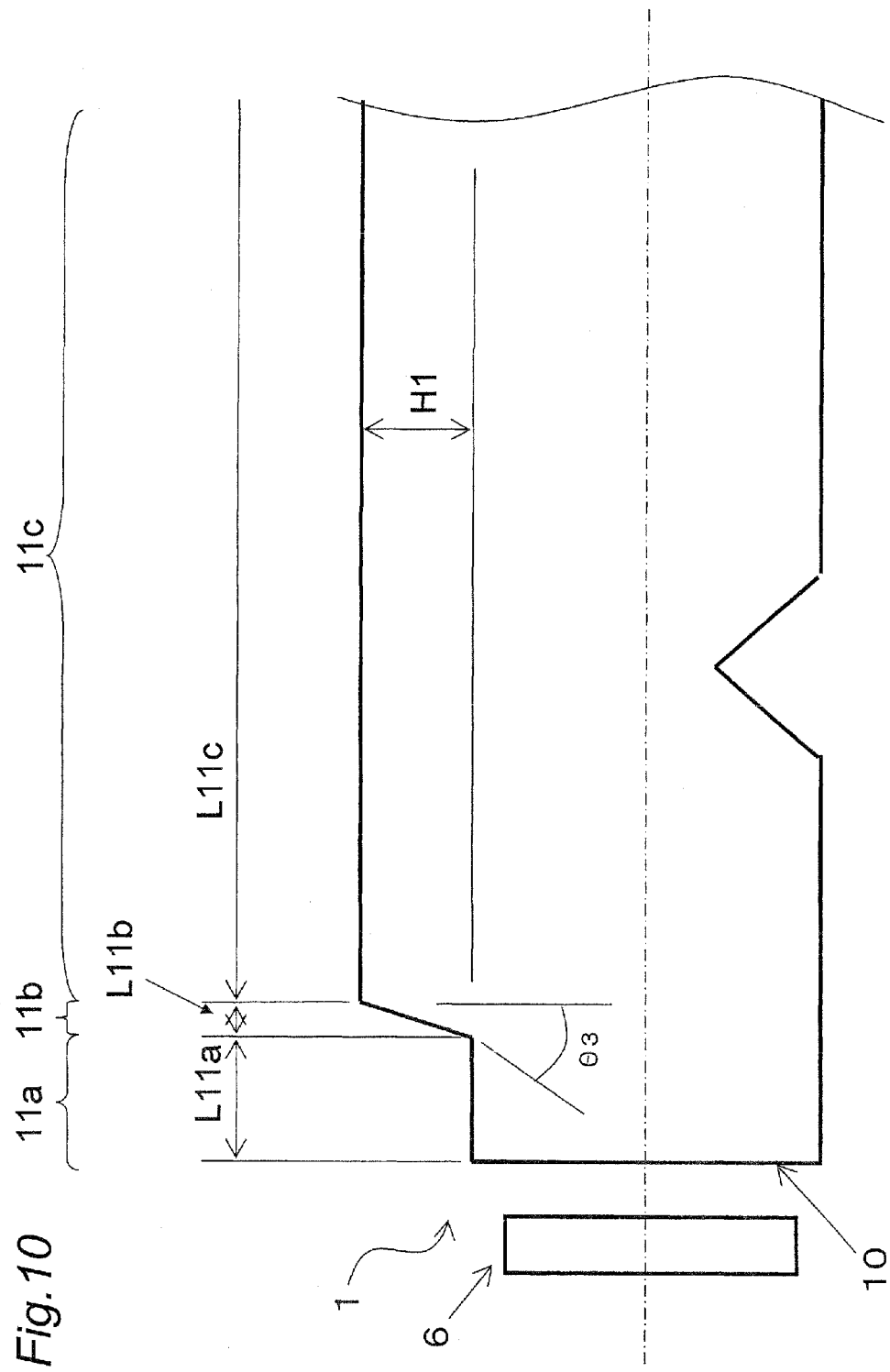
FIG. 10 is a sectional view of the light guide plate, taken along the line Y2-Y2, according to Embodiment 1 of the invention.
Figure 11:
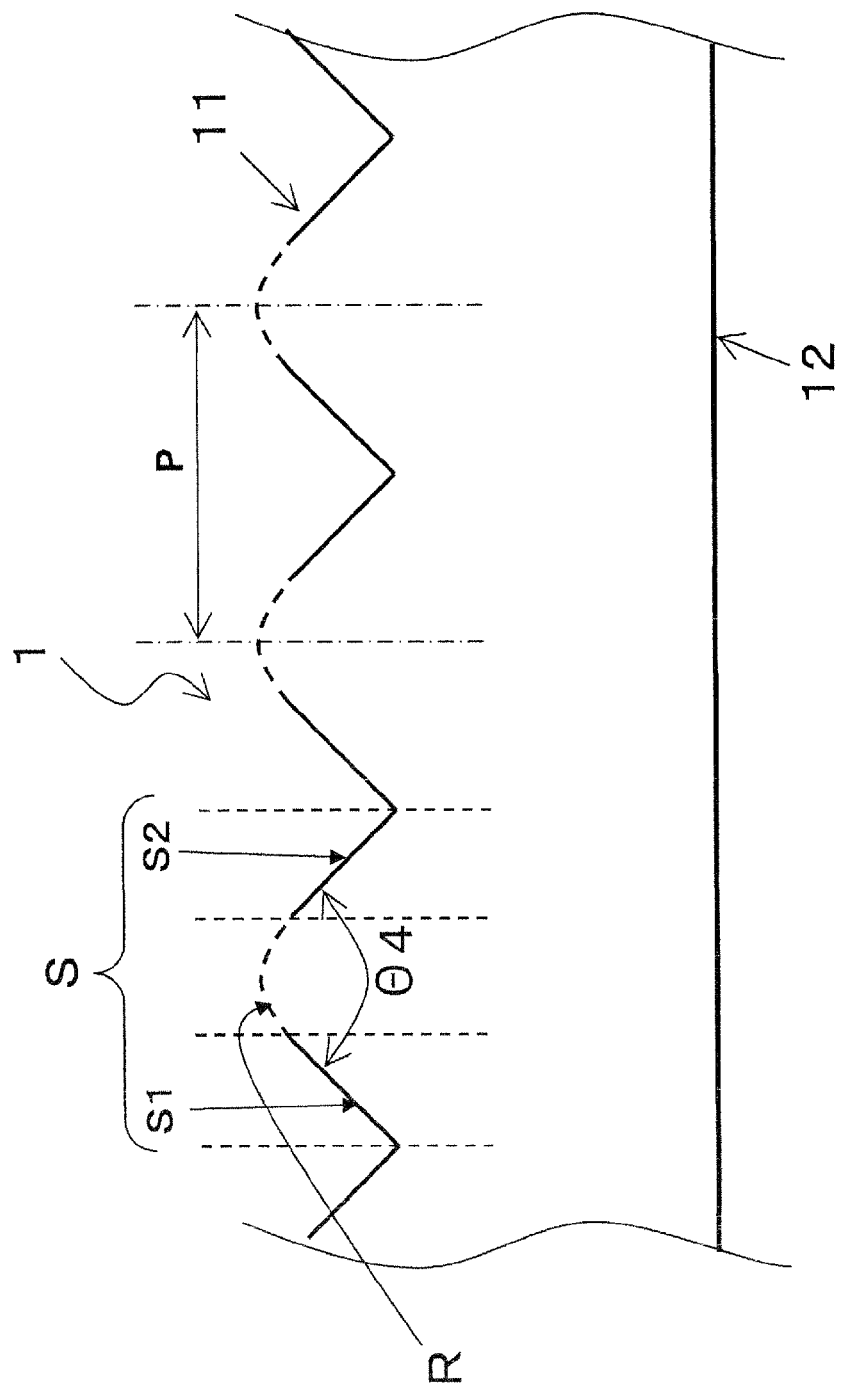
FIG. 11 is a sectional view of the light guide plate, taken along the line X1-X1, according to Embodiment 1 of the invention.

For views of the configuration of the light guide plate 1 at different angles, FIG. 10 shows a sectional view of the light guide plate 1 taken along the line Y2-Y2 of FIG. 9, and FIG. 11 shows a sectional view of the light guide plate 1 taken along the line X1-X1 of FIG. 9. In FIG. 10, reference sign H1 denotes a prism height in the diffusion-and-propagation region 11c, and θ3 denotes an inclination of the diffusion-and-propagation auxiliary region 11b.

As shown in FIG. 11, in a cross section orthogonal to the prism extending direction (a protrusion cross section parallel to the incident surface 10), an upper end of every prism formed in the diffusion-and-propagation region 11c (FIGS. 9 and 10) is not linear-shaped but given a (upwardly protruding) curved portion R of a certain ratio relative to the slope length of the prism. Also, θ4 denotes an apex angle of the prisms formed in the diffusion-and-propagation auxiliary region 11b and the diffusion-and-propagation region 11c.

In FIG. 11, broken lines show the curved portions R. The curved portions R and linear portions S (linear portions S1 and S2) are formed so as to be connected together by tangentials.

By FIGS. 9 to 11, a case where uniform prism protrusions with a certain ratio of the curved portion R given to its upper end are formed all over the effective light-emission area of the outgoing surface 11 has been described above. However, in addition to such a case, other configurations of the outgoing surface as will be described below by FIGS. 12 to 18 may be conceived.

(A Case where No Prism Protrusions are Formed in the Outgoing Surface)

Figure 12:
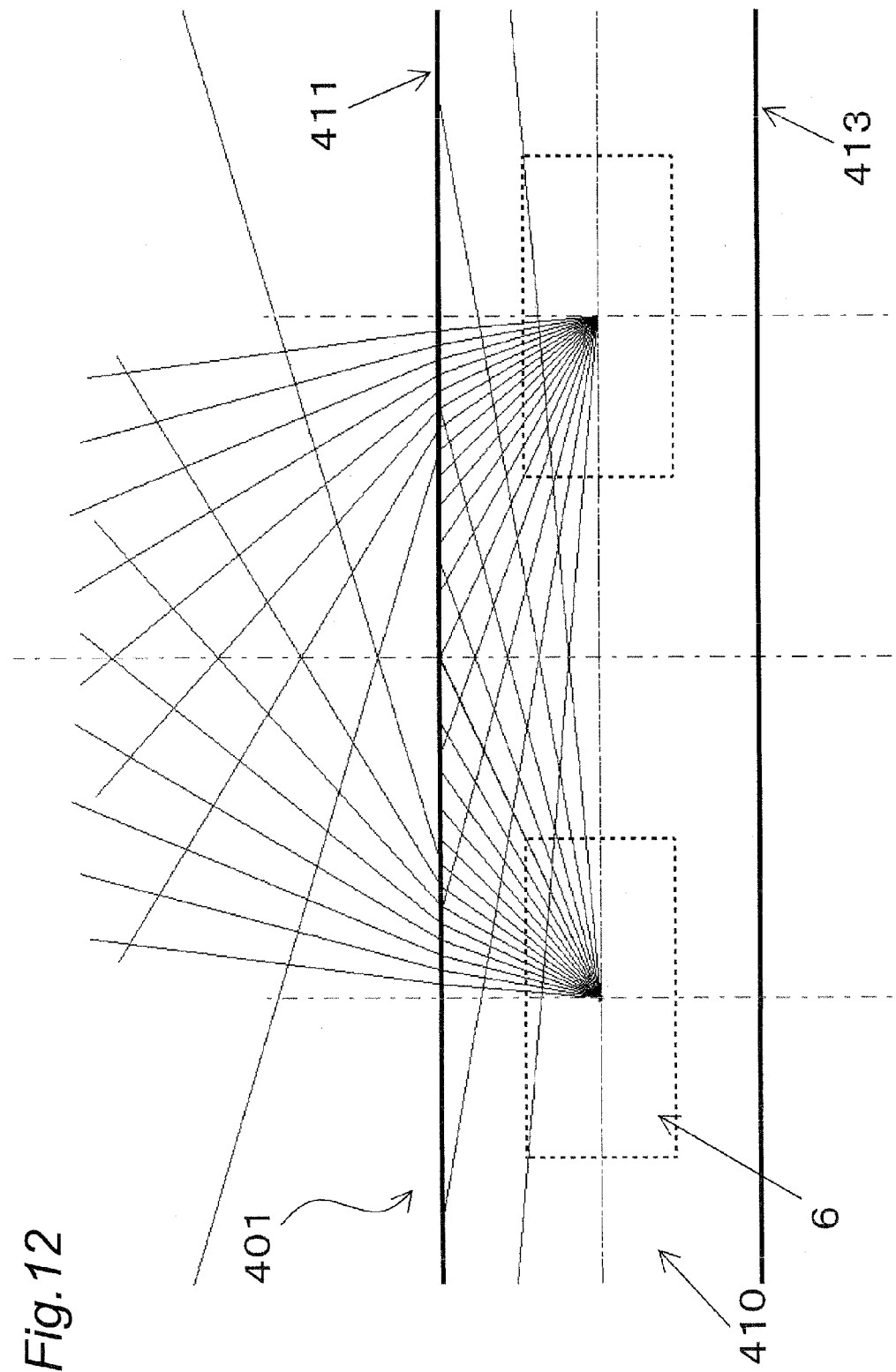
FIG. 12 is an optical path diagram of the light guide plate in which no prism protrusions are formed in the outgoing surface, according to Embodiment 1 of the invention.

FIG. 12 shows an optical path diagram resulting when a light guide plate 401 is viewed in a cross section (XZ cross section) parallel to an incident surface 410 in a case where an outgoing surface 411 is provided as a flat surface with no prism protrusions formed therein.

As shown in FIG. 12, with no prism protrusions formed in the outgoing surface 411, light incident from the LEDs 6 enters the light guide plate 401 through the incident surface 410, being repeatedly reflected and refracted within the light guide plate 401 and then outputted from the outgoing surface 411 in a state of being spread against a frontal direction. With split light emission applied, light goes out to unnecessary ranges due to the above spreading of light, making a factor for deteriorating light characteristics. A phenomenon resultantly occurring to the outgoing surface 411 of the light guide plate 401, as it is viewed from upward of the outgoing surface 411 (in the Z direction), is shown in FIG. 13.

Figure 13:
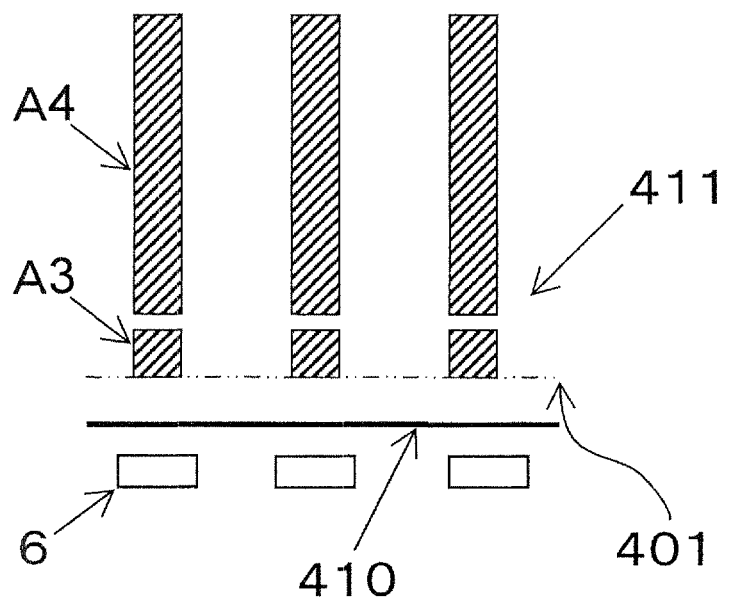
FIG. 13 is a top view showing hot-spot and bright/dark-line occurrence positions in the light guide plate in which no prism protrusions are formed in the outgoing surface, according to Embodiment 1 of the invention.

FIG. 13 shows hot spots A3 and bright lines A4 occurring to the outgoing surface 411 in a case where the whole outgoing surface 411 is formed as a flat surface portion with no prism protrusions formed therein.

First, the hot spots A3 occurring in regions near the incident surface 410 are explained. As shown in FIG. 13, in regions of the outgoing surface 411 in vicinities of the incident surface 410, light is extracted with concentration to the frontal direction of the LED 6, giving rise to the hot spots A3, which are portions brighter than their surrounding vicinities. As shown in FIG. 12, in the outgoing surface 411, with increasing closeness to the frontal direction (Y direction) of an LED 6, the incident angle of light tends to decrease, so that light can more easily be extracted. On the other hand, with increasing distance from the frontal direction of the LED 6, the incident angle increases, causing light to be totally reflected, so that light can less easily be extracted.

On the other hand, with certain extents of distance from the incident surface 410, bright lines A4 occur in the frontal direction of the LED 6, where light becomes more intense, due to imbalance of light intensity caused by influences of the directivity of the LED 6. It is noted that with further more extents of distances, the light intensity is balanced by influences of light outputted from the other LEDs, causing the bright lines A4 to disappear. Thus, the hot spots A3 and the bright lines A4 occur depending largely on the directivity of the LEDs 6, and both the hot spots A3 and the bright lines A4 occur in the frontal directions of the LEDs 6 in the case where no prism protrusions are formed in the whole outgoing surface 411. Also, as the LED placement pitch increases or the total luminous flux per LED increases, there arise even larger darkness-and-brightness differences between regions of the hot spots A3 or the bright lines A4 and their surrounding regions.

(A Case where Prism Protrusions Having Uniform Linear Portions are Formed in the Whole Effective Light-Emission Area of Outgoing Surface)

Figure 14:
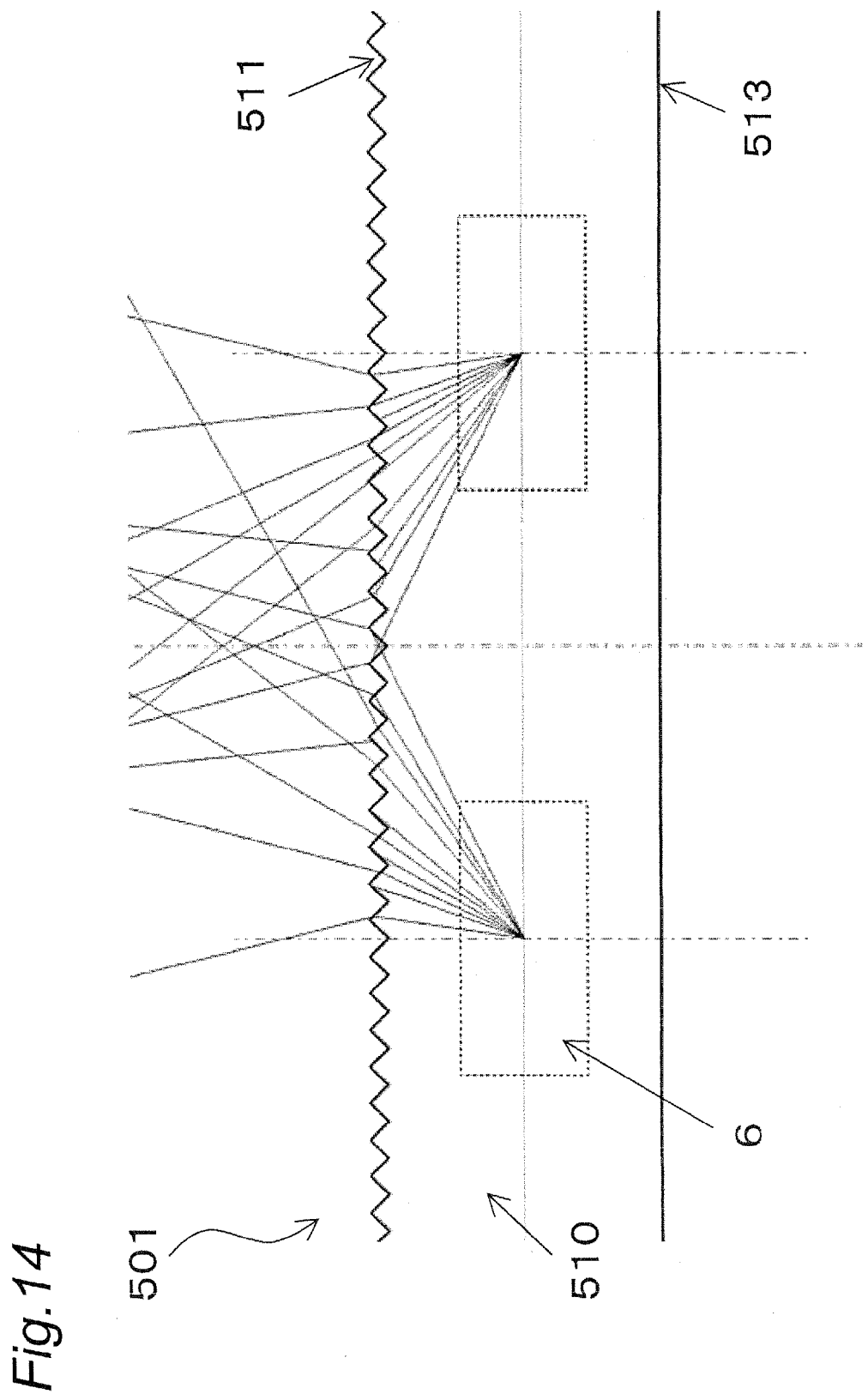
FIG. 14 is an optical path diagram of the light guide plate in which prism protrusions are formed all over the effective light-emission area in the outgoing surface, according to Embodiment 1 of the invention.

In another aspect, FIG. 14 shows an optical path diagram resulting when a light guide plate 501 is viewed in a cross section (XZ cross section) parallel to an incident surface 510 in a case where prism protrusions are formed over the whole effective light-emission area of the outgoing surface 511 (a case where no flat surface portions are present in the effective light-emission area).

As shown in FIG. 14, a cross section of each prism protrusion is formed by linear portions, with no curved portions formed therein. As shown in FIG. 14, in the case where prism protrusions are formed over the whole effective light-emission area of the outgoing surface 511, light incident from the LEDs 6 enters inside of the light guide plate 501 through the incident surface 510, being repeatedly reflected and refracted therein, and then most of the light is outputted from the outgoing surface 511 in a state of being converged to a frontal direction of the outgoing surface 511. Therefore, as compared with the case where no prism protrusions are formed in the outgoing surface 511, the quantity of outgoing light outputted to unnecessary ranges in split light emission decreases, so that the straightness of light is improved and the split light-emission property is improved. However, even in such a case, there occur such hot spots and bright/dark lines as described above.

Figure 15:
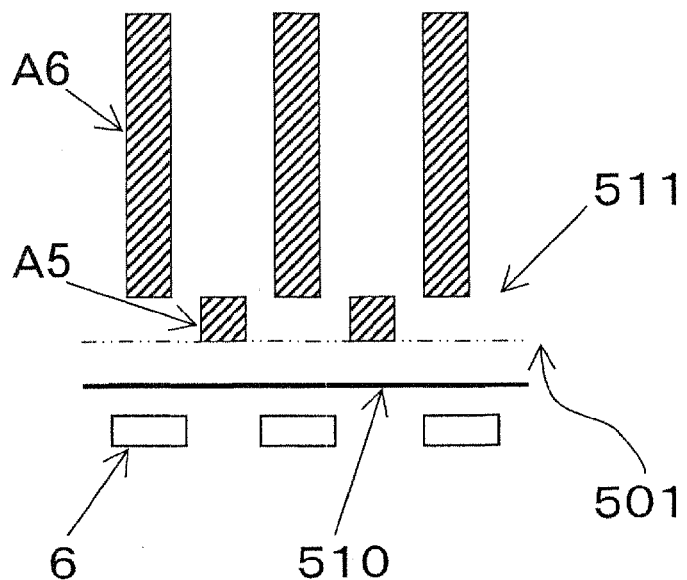
FIG. 15 is a top view showing hot-spot and bright/dark-line occurrence positions in the light guide plate in which prism protrusions having uniform linear portions are formed all over the effective light-emission area in the outgoing surface, according to Embodiment 1 of the invention.

FIG. 15 shows hot spots A5 and bright lines A6 occurring in the case where prism protrusions are formed all over the effective light-emission area of the outgoing surface 511. In such a case where prism protrusions having uniform linear portions are formed, unlike the case where no prism protrusions are formed, as shown in FIG. 15, light is totally reflected at places near the frontal directions of the LEDs 6 (corresponding to the A3 parts of FIG. 13) while light is not totally reflected but extracted from the outgoing surface 511 at A5 parts away from the frontal directions of the LEDs 6. Therefore, the hot spots A5 occur at positions shifted from the frontal directions of the LEDs 6 as shown in FIG. 15. On the other hand, the bright lines A6 occur in the frontal directions of the LEDs 6 regardless of the presence or absence of prism protrusions.

(A Case where Both Prism-Protrusion Present Portions and Absent Portions are Included in the Effective Light-Emission Area of Outgoing Surface)

Figure 16:
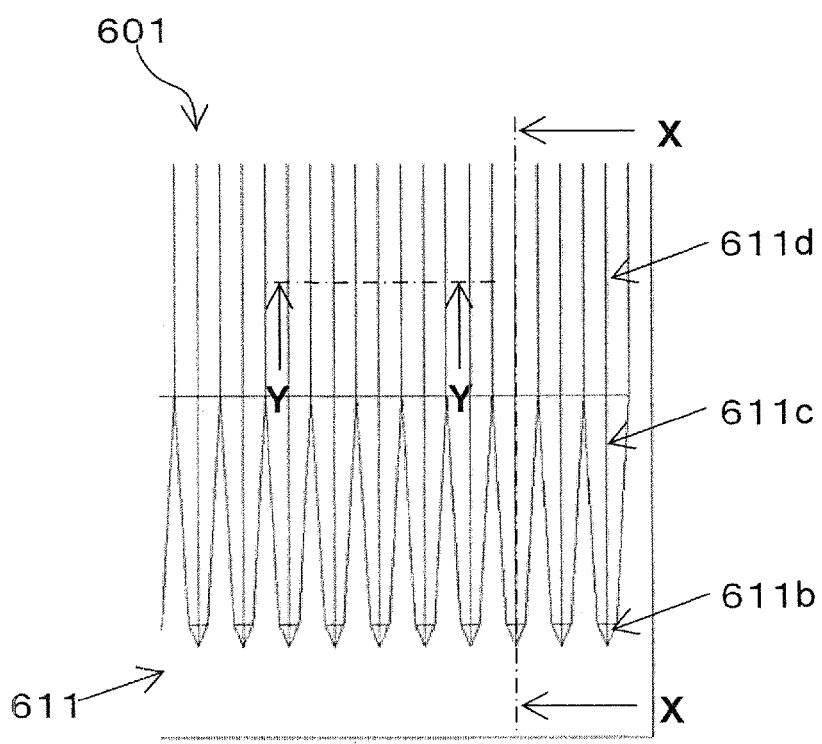
FIG. 16 is a top view of the light guide plate in which both presence and absence portions of prism protrusions are included in the effective light-emission area of the outgoing surface, according to Embodiment 1 of the invention.

As shown in FIG. 16, in a light guide plate 601, flat surface portions are absent and prism protrusions alone are present in a second diffusion-and-propagation region 611d. On the other hand, both prism-protrusion present portions and absent portions (flat surface portions) are included in a diffusion-and-propagation auxiliary region 611b and a first diffusion-and-propagation region 611c, those present and absent portions being formed alternately in the X direction.

Figure 17:
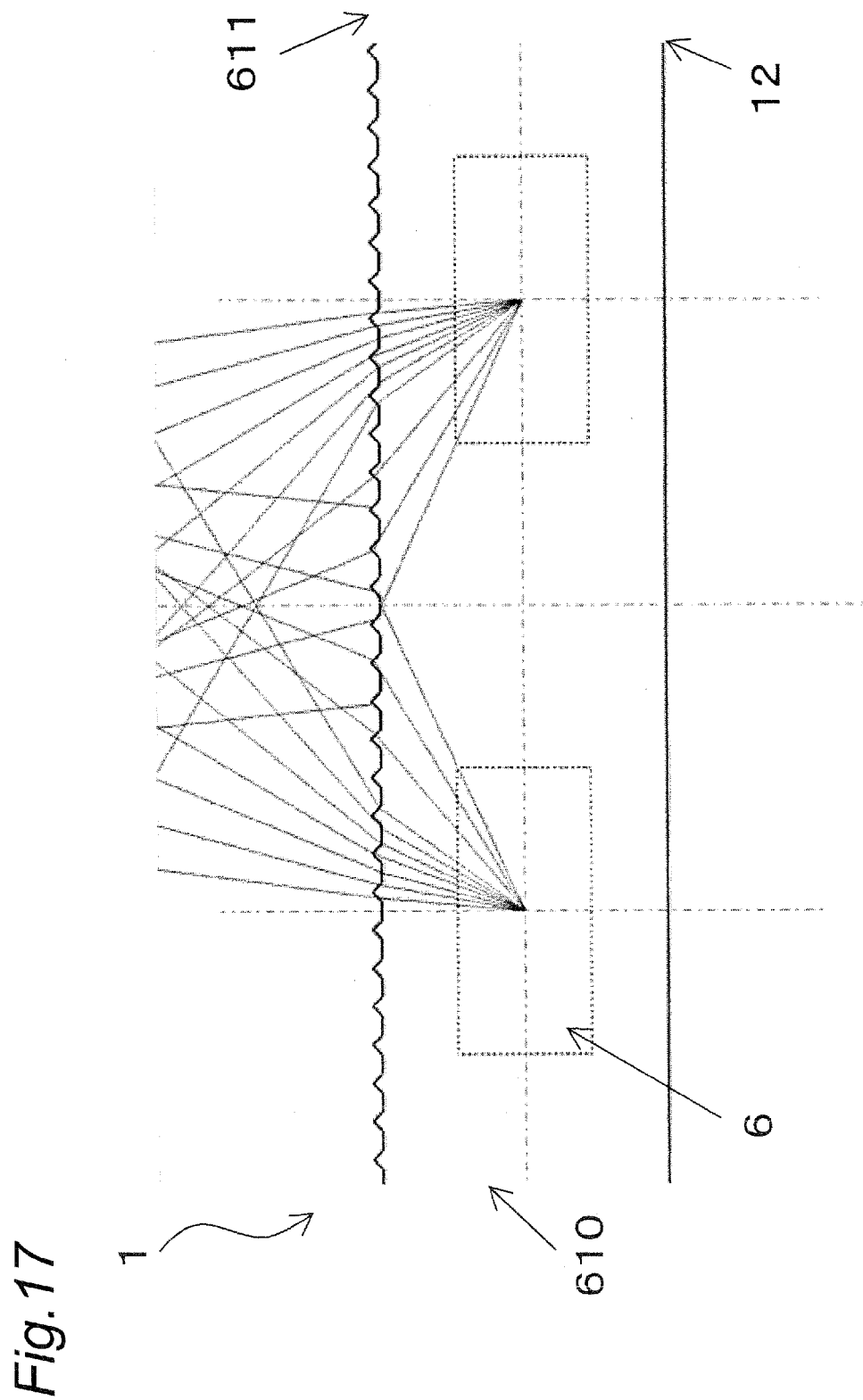
FIG. 17 is an optical path diagram of the light guide plate in which both presence and absence portions of prism protrusions are included in the effective light-emission area of the outgoing surface, according to Embodiment 1 of the invention.

FIG. 17 shows an optical path diagram resulting when the diffusion-and-propagation auxiliary region 611b (FIG. 16) and the first diffusion-and-propagation region 611c (FIG. 16) are viewed in a cross section (XZ cross section) parallel to an incident surface 610. In the diffusion-and-propagation auxiliary region 611b and the first diffusion-and-propagation region 611c, in which prism protrusions are formed, the straightness of light is improved and the split light-emission property is improved, as compared with the case where no prism protrusions are formed.

Hot spots and bright/dark lines are discerned by intensity or weakness of light, and hot-spot occurrence positions differ depending on presence or absence of the prism protrusions. Therefore, the prism protrusions formed in the diffusion-and-propagation auxiliary region 611b and the first diffusion-and-propagation region 611c are varied in height smoothly from a certain range so that slope angles of the prism protrusions are varied to control the outgoing directions of light, allowing uniformization of light intensity to be achieved. By doing so, occurrence of hot spots and bright/dark lines can be prevented.

Figure 18:
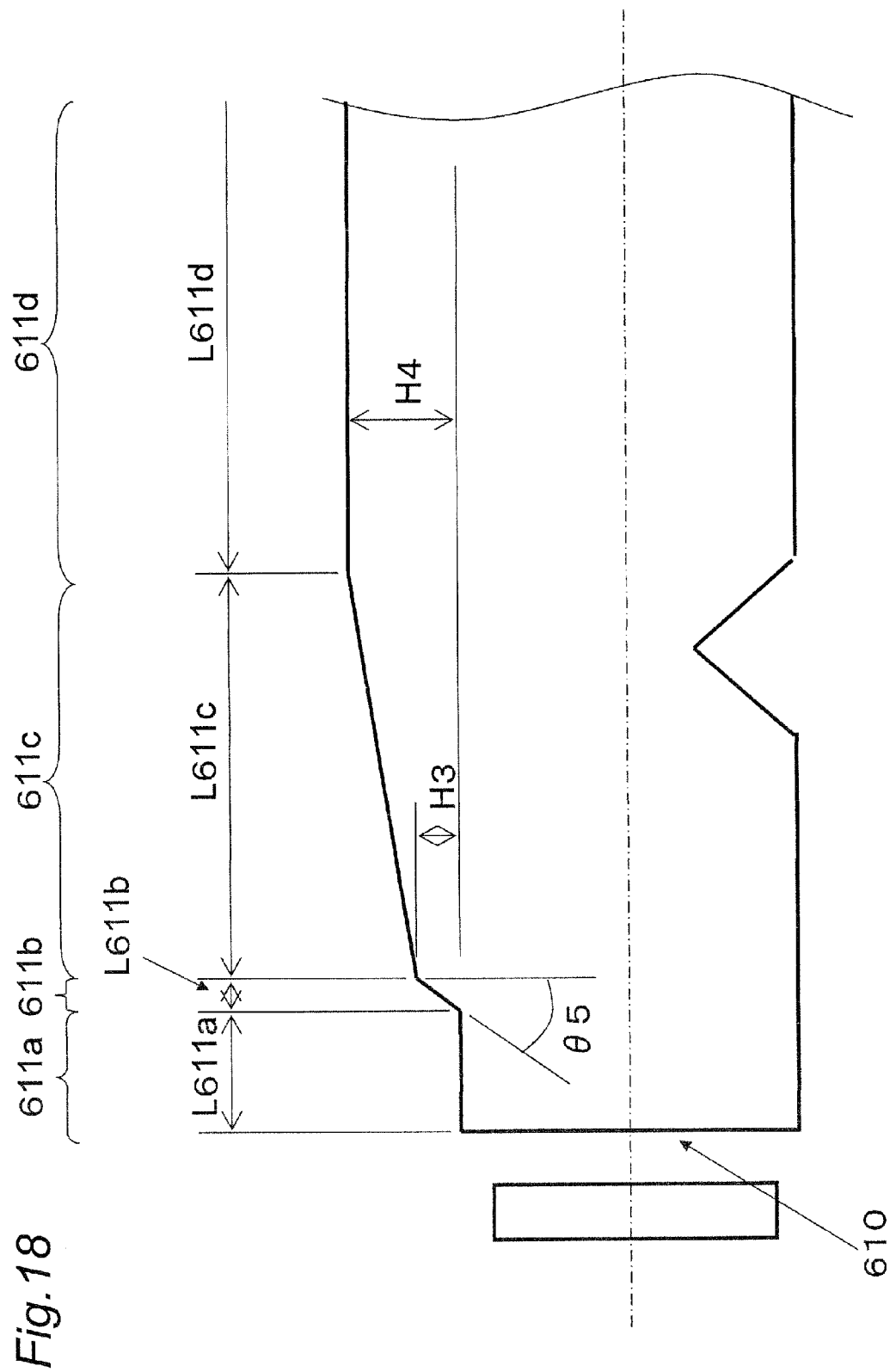
FIG. 18 is a sectional view of the light guide plate, taken along the line X-X, in which both presence and absence portions of prism protrusions are included in the effective light-emission area of the outgoing surface, according to Embodiment 1 of the invention.

More specifically, referring to FIG. 18, prism height of the diffusion-and-propagation auxiliary region 611b and the first diffusion-and-propagation region 611c is increased more and more (from height H3 to height H4) with increasing distance from the incident surface 610 (in the Y direction). Prism height of the second diffusion-and-propagation region 611d is made constant. Also, in the diffusion-and-propagation auxiliary region 611b, a region length L611b is changed as required depending on the diffusivity and moreover changed as required depending on the configuration of the tool for machining process. Thus, an inclination 85 is determined by the region length L611b and the height H3.

However, with the prism structure as described above, although the visibility in the frontal direction is improved by effects of the plurality of prisms present in the effective light-emission area, yet it is impossible to improve even the visibility in angular directions. FIG. 19 shows a visibility checking result on the light guide plate with the above-described prism structure (FIGS. 16-18), and a visibility checking result on the light guide plate (FIGS. 9-11) in Embodiment 1. More specifically, FIG. 19(A) shows a luminance distribution on the light guide plate in a case where both prism-protrusion present portions and absent portions are included in the effective light-emission area of the outgoing surface 611 shown in FIG. 16. Also, FIG. 19(B) shows a luminance distribution on the light guide plate in a case where uniform prism protrusions with a certain ratio of curved portion given to their upper end are formed all over the effective light-emission area of the outgoing surface 11 shown in FIG. 3. It is noted that as shown in FIG. 19(C), an angle θ6 that corresponds to a visual direction for checking of the visibility (i.e., evaluation angle direction) is an angle formed against a normal line in the outgoing surface 611 of the light guide plate 601 in this Embodiment 1.

As shown in FIG. 19(A), in the case where both prism-protrusion present portions and absent portions are included in the effective light-emission area of the outgoing surface 611 (FIG. 17), it can be understood that there is no problem in visibility in frontal directions in which the angle θ6 is close to 0° while the visibility is worsened with the angle θ6 equal to or over 60°. More specifically, with the angle θ6 equal to or over 60°, bright-line nonuniformities occur in vicinities of the light input part (upward portions in the figure) while the brightness shows abrupt changes with increasing distance from the light input part. The reason of this is that the light propagation direction is changed by the prisms in the first diffusion-and-propagation region 611c (FIG. 16), causing a difference from the light propagation direction in the second diffusion-and-propagation region 611d (FIG. 16). From the reasons shown above, with a plurality of prisms used in the effective light-emission area, it is difficult to completely eliminate hot spots and bright-line nonuniformities while the split light-emission property is maintained. Such changes in bright-line nonuniformities are caused by prism surfaces in the diffusion-and-propagation auxiliary region 611b and the first diffusion-and-propagation region 611c. That is, the changes are caused by three-dimensional-like angles of prism surfaces in the first diffusion-and-propagation region 611c, the directivity of the LEDs, and the refractive index of the light guide plate 601.

(A Case where Uniform Prism Protrusions with a Certain Ratio of Curved Portion Given to their Upper End are Formed all Over the Effective Light-Emission Area of the Outgoing Surface 11)

On the other hand, in Embodiment 1, as shown in FIG. 9, flat surface portions are absent and prism protrusions alone are present in the diffusion-and-propagation region 11c of the light guide plate 1. Also, the diffusion-and-propagation auxiliary region 11b is formed outside the effective light-emission area. With the optical path in the case of the cross-sectional shape of the curved portion R shown in FIG. 11, light is diffused by the curve shape of the curved portion R. Therefore, hot spots and bright line/dark lines (FIGS. 13 and 15) due to concentrated output of light in particular directions are less likely to occur. Also, as shown in FIG. 19(B), it can be understood that with regard to the visibility on the light guide plate with the above-described prism structure, there is no significant problem in visibility in the frontal direction and moreover the visibility is kept from worsening even in angular directions in which the angle θ is equal to or over 60°. This is because the linear portions S of the prisms are given a function of ensuring the split light-emission property and moreover the curved portions R at the upper end of the prisms are given a function of eliminating hot spots and bright-line nonuniformities of the light input part so that the hot spots and bright-line nonuniformities can be solved while the split light-emission property is maintained.

More specifically, referring to FIG. 10, the prism height in the diffusion-and-propagation auxiliary region 11b is set so as to increase more and more (in the Y direction) with increasing distance from the incident surface 10 while the prism height in the diffusion-and-propagation region 11c is made constant. In Embodiment 1, the height H1 in the diffusion-and-propagation region 11c is set to 32.5 µm and the radius of the curved portion R (FIG. 11) at the upper end is set to 20 µm. Also, region lengths of the propagation region 11a, the diffusion-and-propagation auxiliary region 11b and the diffusion-and-propagation region 11c satisfy a relationship "L11b<L11a<L11c". The curved portions R of the prism upper end primarily have a role of preventing occurrence of hot-spot and bright/dark lines of the outgoing surface 11, and the linear portions S primarily have a role of controlling the angle-of-visibility characteristics of the light guide plate 1.

The roles of the propagation region 11a, the diffusion-and-propagation auxiliary region 11b and the diffusion-and-propagation region 11c are explained in more detail. The propagation region 11a has a role of preventing occurrence of hot spots due to the LED placement pitch and directivity as well as expansion and contraction of the light guide plate 1 due to influences of heat from the light source. The diffusion-and-propagation auxiliary region 11b has a role of assisting the diffusion-and-propagation region 11c to suppress the occurrence of hot spots, so being more effective in cases where the directivity of the LEDs 6 is strong. The diffusion-and-propagation region 11c, by virtue of the curved portions R formed at the prism upper ends, not only suppresses hot spots and bright/dark lines but also makes it possible that the outgoing direction of light in ranges where no hot spots or bright/dark lines occur is converged to the frontal direction.

In Embodiment 1, the slope angle θ3 of the diffusion-and-propagation auxiliary region 11b is set to 3°. The region lengths L11a, L11b of the propagation region 11a and the diffusion-and-propagation auxiliary region 11b are set to about 2 mm and about 0.7 mm, respectively. Further, it is also allowable that the region length L11a of the propagation region 11a decreases more and more with decreasing LED placement pitch, and that the region length L11a increases more and more with increasing LED placement pitch. The lengths H1, L11b and L11c are also changed as required depending on the LED placement pitch and total luminous flux per LED. Furthermore, as shown in FIG. 11, the placement pitch P of the prism shapes of the outgoing surface 11 is set to 65 µm, and their apex angle θ4 is set to about 90°. In this Embodiment 1, these numerical values are also changed as required depending on required optical characteristics.

(Ratio of Linear Portion S to Curved Portion R in Composition of Prism Protrusions)

Now the ratio of linear portion S to curved portion R, both constituting the prism protrusion, is explained with reference to FIG. 20. FIG. 20(A)-(D) show luminance distributions (top view) on the light guide plate in vicinities of the light input part, cross-sectional luminance charts (A-A cross section, B-B cross section, C-C cross section, D-D cross section), and characteristic evaluations resulting when particular LEDs are worked for light emission so as to exert split light emission of a particular split light-emission range.

FIG. 20(A) shows a case where prism protrusions each having a uniform linear portion are formed, FIG. 20(B) shows a case where the ratio of linear portion length to curved portion length in each prism of the outgoing surface is set to 1:0.6, FIG. 20(C) shows a case where the ratio of linear portion length to curved portion length in each prism of the outgoing surface is set to 1:0.3, and FIG. 20(D) shows a case where the ratio of linear portion length to curved portion length in each prism of the outgoing surface is set to 1:1. In addition, in the cross-sectional luminance charts, the X axis (position) represents a distance (mm) from the side face of the light guide plate, and the Y axis represents a front luminance $(cd/m^2)$ measured from the front side.

FIG. 20(A) is a luminance distribution chart checking result on the light guide plate in a case where prism protrusions each having a uniform linear portion S as shown in FIG. 14 are formed all over the effective light-emission area on the outgoing surface side. As shown in FIG. 20(A), it can be seen that luminance differences appear largely in vicinities of the light input part (left side in the figure). Also, checking the luminance chart of A-A cross section makes it understood that a luminance aa of a bright portion is about 4 to 5 times higher than a luminance bb of a dark portion in the light-emitting surface. A hot spot can be discerned by this effect.

FIG. 20(B) shows a luminance distribution chart on the light guide plate and a luminance chart of B-B cross section in a case where uniform prism protrusions with a certain ratio of curved portion R given to the upper end as shown in FIG. 11 are formed all over the effective light-emission area. In Embodiment 1, the ratio of linear portion to curved portion is set to 1:0.6. As shown in FIG. 20(B), it can be seen that luminance differences as described above are reduced to 1.5 to 2 times smaller ones in vicinities of the light input part.

Figure 21:
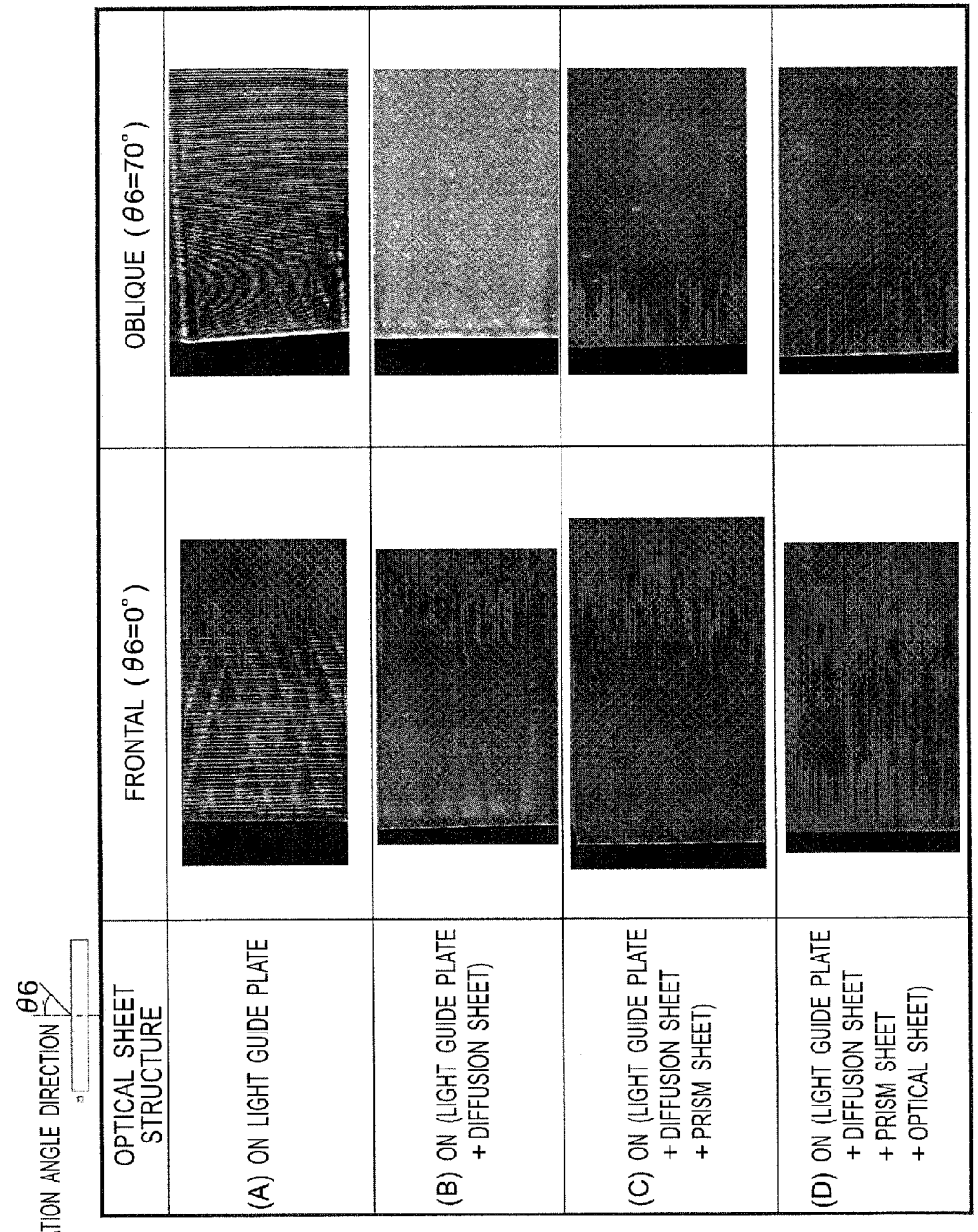
FIG. 21 is a prototype making result view of a light guide plate in which uniform prism protrusions with a certain ratio of a curved portion R (length of linear portion S:length of curved portion R=1:0.6) given at its upper end are present all over the effective light-emission area of the outgoing surface according to Embodiment 1 of the invention.

Also, prototype making results of the light guide plate in this case are shown in FIG. 21. FIG. 21(A) is a light emission photograph on the light guide plate, FIG. 21(B) is a light emission photograph in a state that a diffusion sheet is set on the light guide plate, FIG. 21(C) is a light emission photograph in a state that a diffusion sheet and a prism sheet are set on the light guide plate, and FIG. 21(D) is a photograph in a state that a diffusion sheet, a prism sheet and an optical sheet are set on the light guide plate. As shown in FIG. 21(E), an angle θ6 from a normal line in the outgoing surface of the light guide plate is used as a visual direction for checking of the visibility. It is noted that FIGS. 21(A)-21(D) show results in cases where the angle θ6 is 0° and 70°.

As shown in FIG. 21(D), it can be seen that hot-spot and bright lines have been solved in the state that all the sheets are combined together.

Reverting to FIG. 20, FIG. 20(C) shows a luminance distribution chart and a luminance chart of C-C cross section in a case where the ratio of linear portion length to curved portion length is set to 1:0.3. FIG. 20(D) shows a luminance distribution chart and a luminance chart of D-D cross section in a case where the ratio of linear portion S length to curved portion R length is set to 1:1. As shown in FIGS. 20(C) and 20(D), it can be seen that both characteristics of light nonuniformities (bright-line nonuniformities) and split light-emission property are successful as in the case of FIG. 20(B).

From the results shown in FIG. 20(A) to 20(D), it can be seen that the degree of luminance differences is changed by changing the ratio of linear portion length to curved portion length in each prism. This change quantity may be changed as required depending on characteristics of the optical sheet set on the light guide plate. More specifically, indeed hot-spot nonuniformities are improved by lessening luminance fluctuating differences on the light guide plate, yet an excessively increased length of the curved portion R would cause deteriorations of the split light-emission property. Thus, preferably, the shape of the prism protrusion in a cross section parallel to its incident surface is projecting-shaped (upwardly projecting shape), and the ratio of linear portion S length to curved portion R length in the projecting shape (chevron shape, mountain shape) satisfies a relationship:

$$0.3 \leq (\text{length of curved portion } R)/(\text{length of linear portion } S) \leq 1.0$$

in order to fulfill both the ensuring of split light-emission property and the solving of hot spots and bright-line nonuniformities.

As described above, according to the light guide plate 1 of this Embodiment 1, the propagation region 11$a$, which is a flat surface portion, suppresses influences on the effective light-emission area due to expansion and contraction of the light guide plate caused by heat from the light source. Also, the diffusion-and-propagation auxiliary region 11$b$ and the diffusion-and-propagation region 11$c$, in which prism protrusions having the curved portion R at their upper end are formed uniformly, uniformize the outgoing light to suppress the occurrence of hot spots and bright/dark lines and moreover converge the outgoing direction of light to the frontal direction. By setting the shape of each prism protrusion in this way, it becomes possible to suppress the hot spots and bright/dark lines without impairing the split light-emission property and the light use efficiency.

Embodiment 2

A surface light source device according to Embodiment 2 of the invention is described below with reference to FIGS. 22 to 27.

Figure 22:
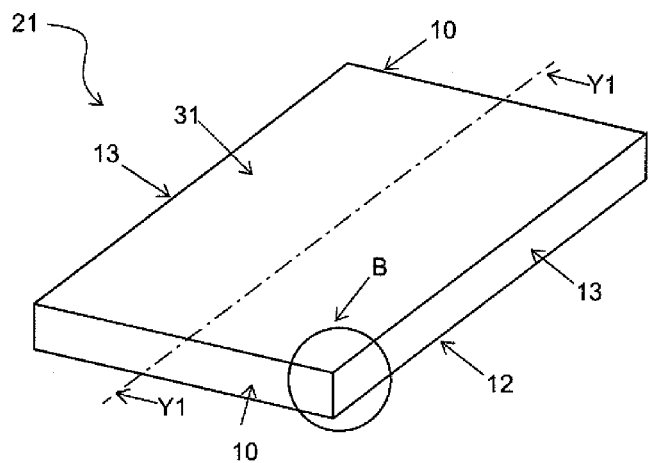
FIG. 22 is a perspective view of a light guide plate according to Embodiment 2 of the invention.
Figure 23:
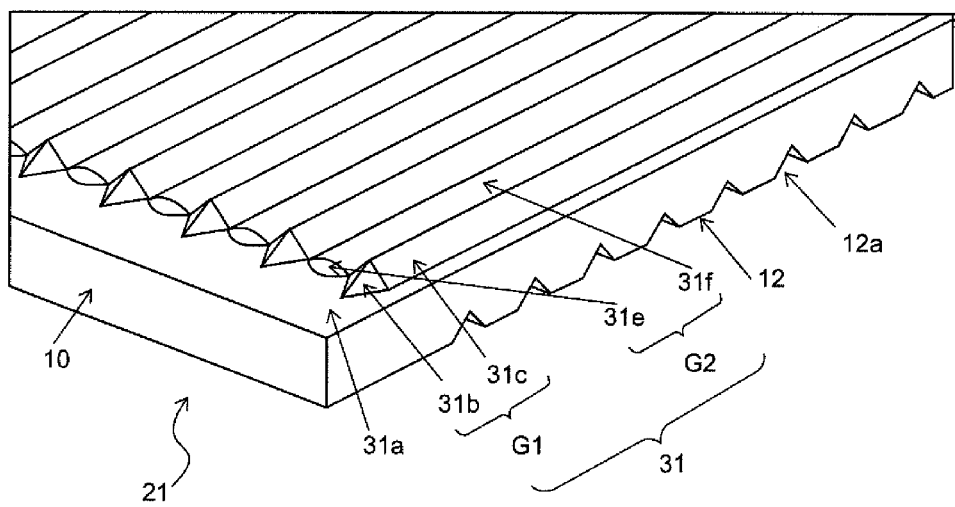
FIG. 23 is a perspective view of B part of the light guide plate according to Embodiment 2 of the invention.
Figure 24:
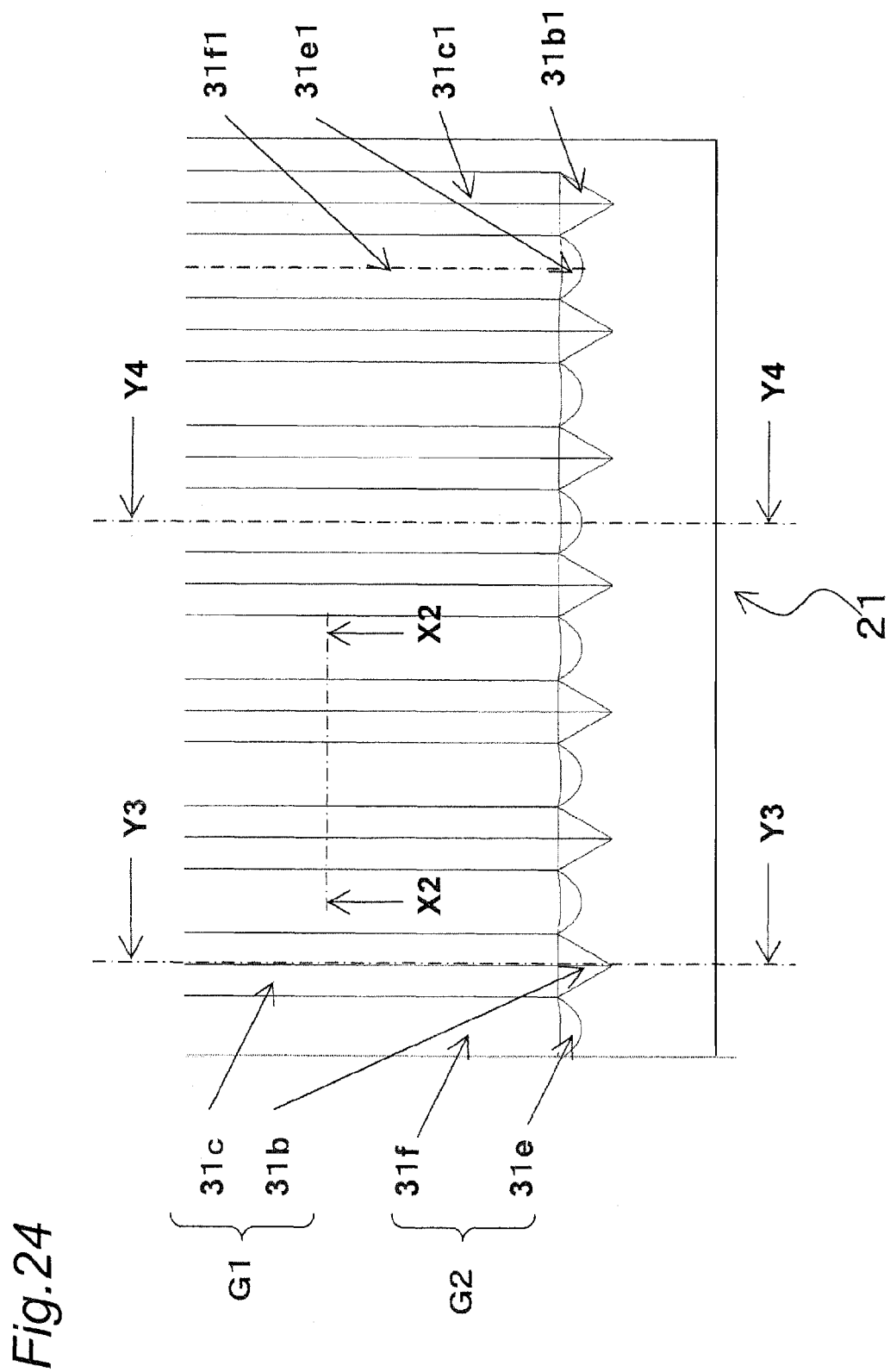
FIG. 24 is a top view of B part of the light guide plate according to Embodiment 2 of the invention.

FIG. 22 shows a light guide plate 21 according to this Embodiment 2, and FIGS. 23 and 24 are a perspective view and a top view, respectively, of B part of FIG. 22 in the light guide plate 21. In FIG. 22, an outgoing surface 31 is a surface from which light incident from the incident surface 10 is outputted. The surface light source device according to this Embodiment 2 differs from the surface light source device (FIG. 2) of Embodiment 1 only in the configuration of the outgoing surface of the light guide plate, the rest of the structure being similar to that of Embodiment 1. More specifically, in this Embodiment 2, two groups of prism protrusions are provided in the outgoing surface, and a placement ratio of those groups is changed depending on the LED placement pitch and the total luminous flux per LED.

As shown in FIG. 23, the two groups of prism protrusions are a prism-protrusion group G1 including a diffusion-and-propagation auxiliary region 31$b$ and a diffusion-and-propagation region 31$c$ and having a role of controlling the outgoing direction of light from the light guide plate 21, and a prism-protrusion group G2 including a diffusion-and-propagation region 31$e$ and a diffusion-and-propagation region 31$f$. By changing the placement ratio of these prism-protrusion groups G1, G2, it becomes possible to locally change the outgoing direction of light, thus making it practicable to improve the split light-emission property and suppress hot spots and bright/dark lines. Details of the prism protrusions will be described later.

As shown in FIG. 24, in the prism-protrusion group G1, a prism ridge 31$b$1 formed in the diffusion-and-propagation auxiliary region 31$b$ and a prism ridge 31$c$1 formed in the diffusion-and-propagation region 31$c$ are connected to each other. Similarly, in the prism-protrusion group G2, an imaginary prism ridge 31$e$1 formed in the diffusion-and-propagation auxiliary region 31$e$ and an imaginary prism ridge 31$f$1 formed in the diffusion-and-propagation region 31$f$ are also connected to each other.

Figure 25:
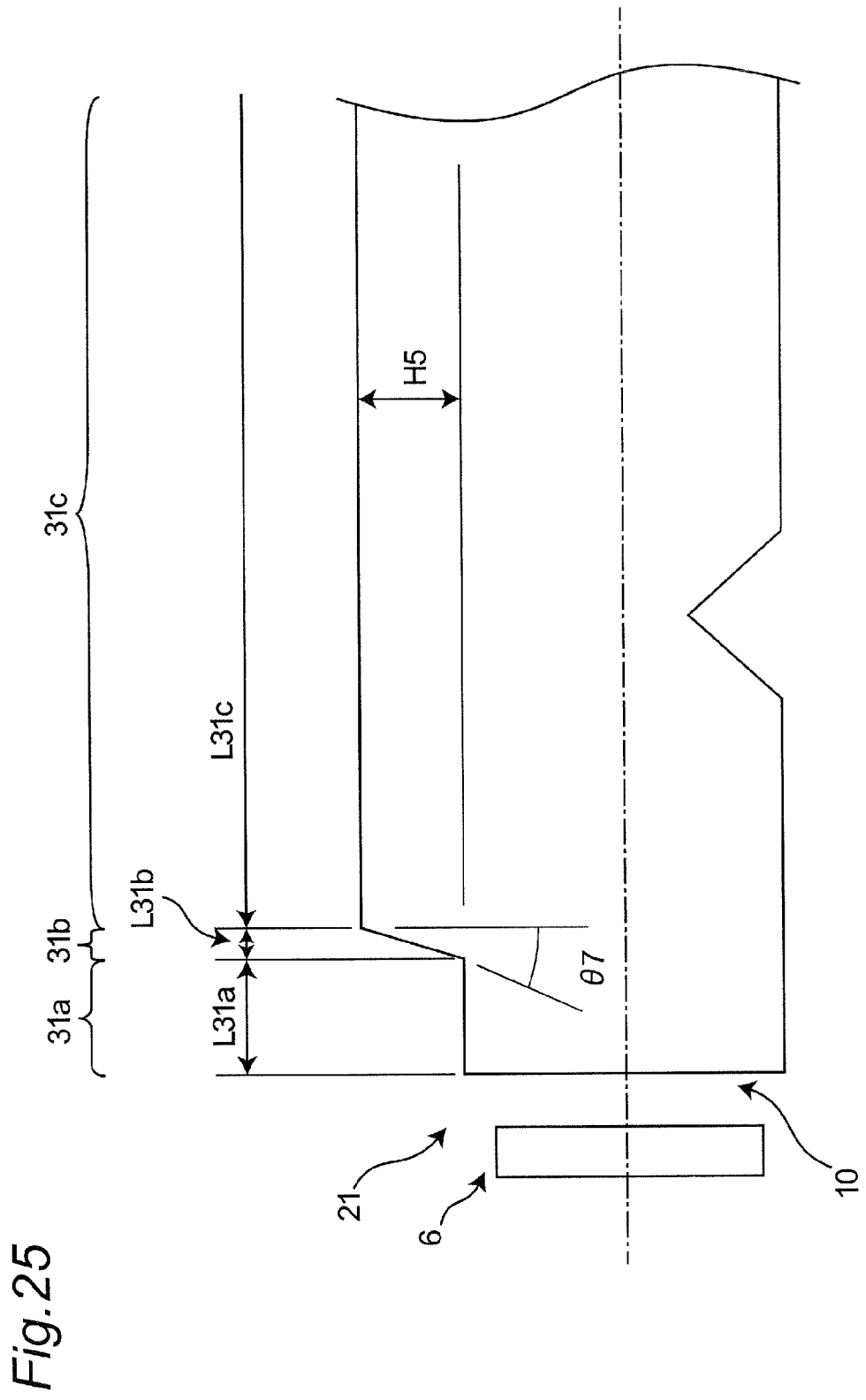
FIG. 25 is a sectional view of the light guide plate, taken along the line Y3-Y3, according to Embodiment 2 of the invention.
Figure 26:
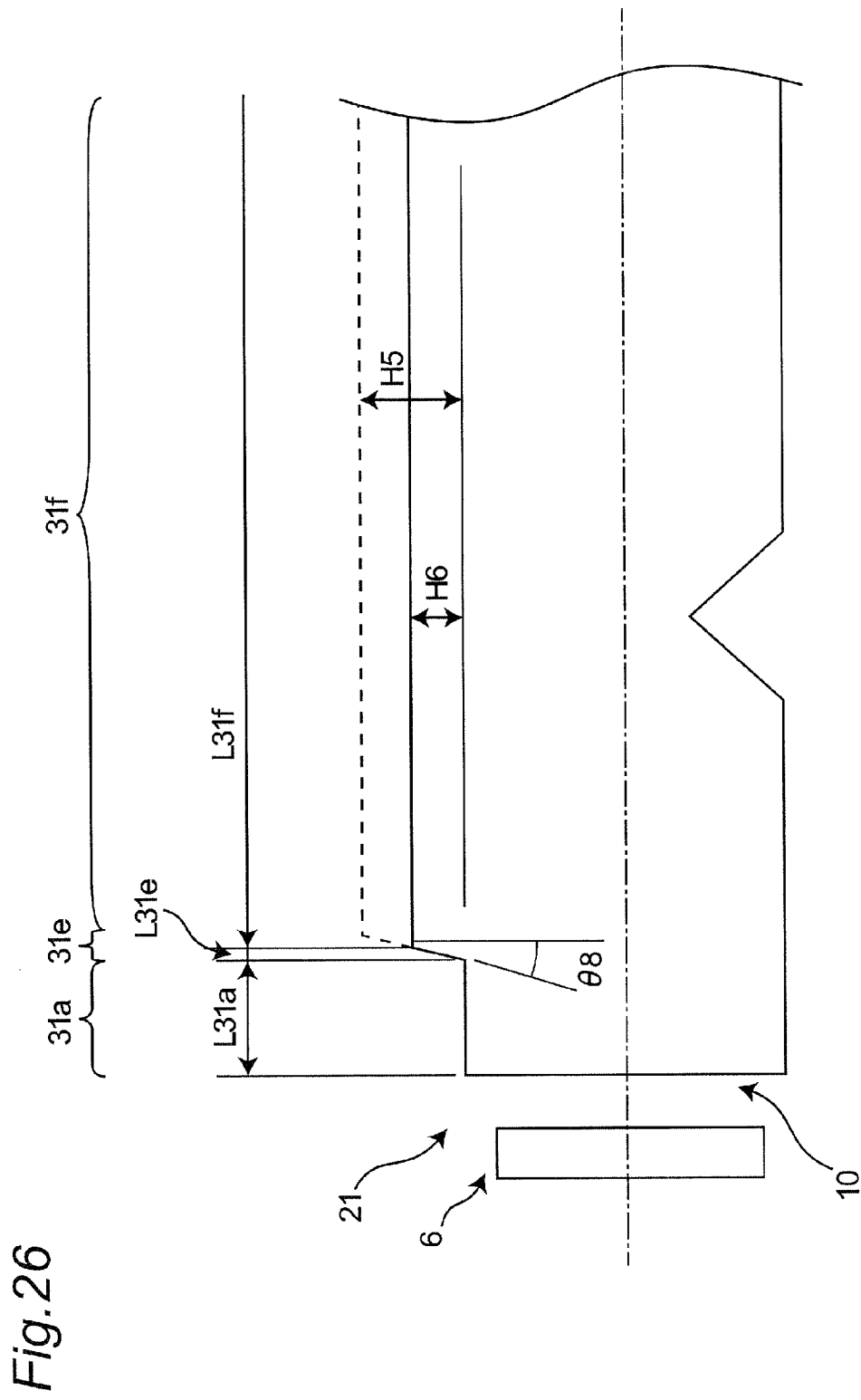
FIG. 26 is a sectional view of the light guide plate, taken along the line Y4-Y4, according to Embodiment 2 of the invention.
Figure 27:
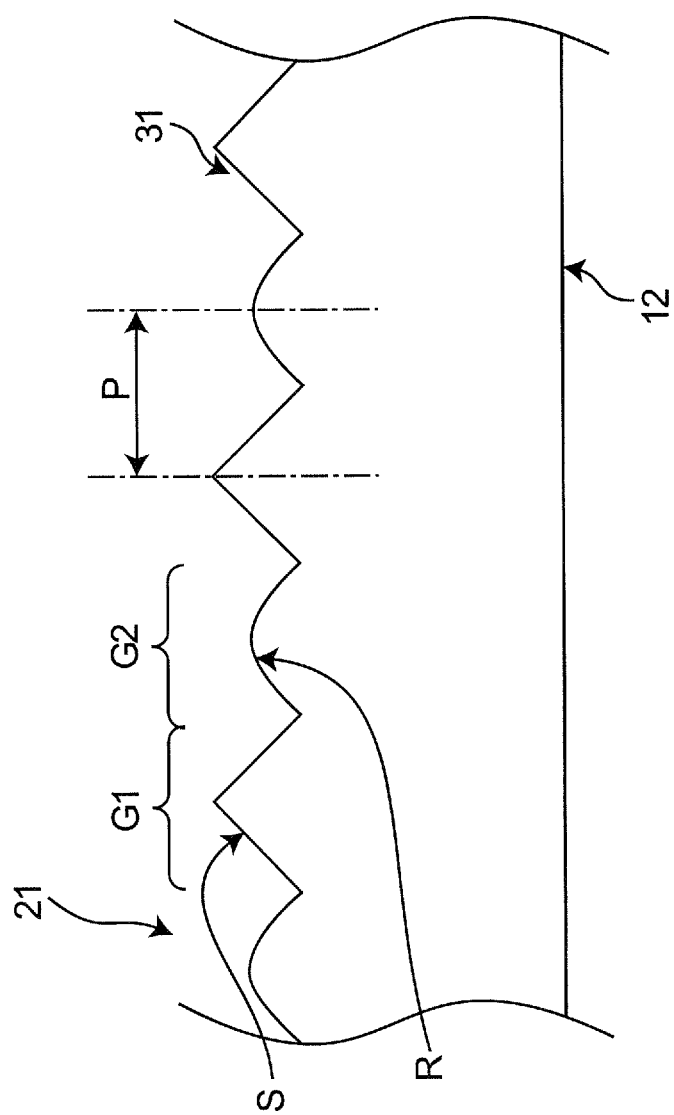
FIG. 27 is a sectional view of the light guide plate, taken along the line X2-X2, according to Embodiment 2 of the invention.

FIG. 25 is a sectional view taken along the line Y3-Y3 of FIG. 24 (prism-protrusion group G1), and FIG. 26 is a sectional view taken along the line Y4-Y4 of FIG. 24 (prism-protrusion group G2). FIG. 27 is a sectional view taken along the line X2-X2 of FIG. 24.

With reference to FIG. 27, the prism-protrusion group G1 includes (first) prism protrusions having a linear shape at their upper end, and the prism-protrusion group G2 includes (second) prism protrusions having a circular-shaped cross section (a curved portion at the upper end). The prisms of the prism-protrusion group G1 have a role of ensuring the split light-emission property, and the prisms of the prism-protrusion group G2 have a role of suppressing hot spots and bright lines. The reason of this is that the (linear-shaped) prisms of the prism-protrusion group G1 have an effect of directing light toward particular directions while the (R-shaped) prisms of the prism-protrusion group G2 have an effect of diffusing light toward unspecific directions.

The prism-protrusion shape of the prism-protrusion group G1 is explained with reference to FIG. 25. As shown in FIG. 25, prism height of the diffusion-and-propagation auxiliary region 31$b$ is increased more and more with increasing distance from the incident surface 10 (in the Y direction), and a length L31$b$ of the diffusion-and-propagation auxiliary region 31$b$ is determined by the inclination 87. Also, a prism height H5 of the diffusion-and-propagation region 31$c$ is constant. In Embodiment 2, region lengths L31$a$, L31$b$ and L31$c$ shown in FIG. 25 satisfy a relationship "L31$b$≤L31$a$≤L31$c$". L31$b$ primarily a role of assisting diffusion and propagation of light of the incident surface 10 while L31$c$ primarily has a role of controlling viewing-angle characteristics of the light guide plate 21. Concrete functions are similar to those shown in Embodiment 1.

Next, with reference to FIG. 26, the prism-protrusion shape of the prism-protrusion group G2 is explained. As shown in FIG. 26, in this Embodiment 2, prism height of the diffusion-and-propagation auxiliary region 31$e$ is increased more and more with increasing distance from the incident surface 10, and a region length L31$e$ of the diffusion-and-propagation auxiliary region 31$e$ is determined by the inclination N. Also, a prism height H6 of the diffusion-and-propagation region 31$f$ is made constant. In Embodiment 2, region lengths L31$a$, L31$e$ and L31$f$ shown in FIG. 26 satisfy a relationship "L31$e$≤L31$a$<L31$f$". The region lengths L31$e$ and L31$f$ primarily have a role of controlling hot spots and bright/dark lines of the incident surface 10.

The placement ratio between the prism-protrusion group G1 having the cross-sectional shape shown in FIG. 25 and the prism-protrusion group G2 having the cross-sectional shape shown in FIG. 26 is set to 1:1 in FIG. 23, but may be changed as required. The prism height H5 of the prism-protrusion group G1 and the prism height H6 of the prism-protrusion group G2 may also be changed as required depending on changes in the LED placement pitch and the total luminous flux per LED. By doing so, even more uniformization of light intensity can be achieved, so that hot spots and bright/dark lines can be suppressed without impairing the split light-emission property and the light use efficiency.

As described above, according to this Embodiment 2, in an edge-light type backlight, the configuration of the outgoing surface 31 is changed depending on the number of LEDs 6 in use and the LED placement pitch, as in the case of Embodiment 1. As a result of this, light can be efficiently extracted from the LEDs 6 under electric power saving without impairing the light use efficiency and without depending on the placement interval of the LEDs and moreover without impairing the split light-emission property, with use of necessary minimum numbers of LEDs 6. Furthermore, by eliminating hot spots and bright/dark lines, there can be realized a light guide plate 21 prevented from impairment of light uniformity. Besides, in terms of the split light-emission property, the quantity of light leakage to unnecessary areas in shorter-hand directions of the light guide plate 21 can be reduced.

It is noted that the present invention is not limited to the foregoing Embodiments 1 and 2, and may be carried out in other various aspects. For example, in the above Embodiments 1 and 2, a structure including no diffusion-and-propagation auxiliary region 11*b*, 31*b* may also be adopted.

Figure 28:
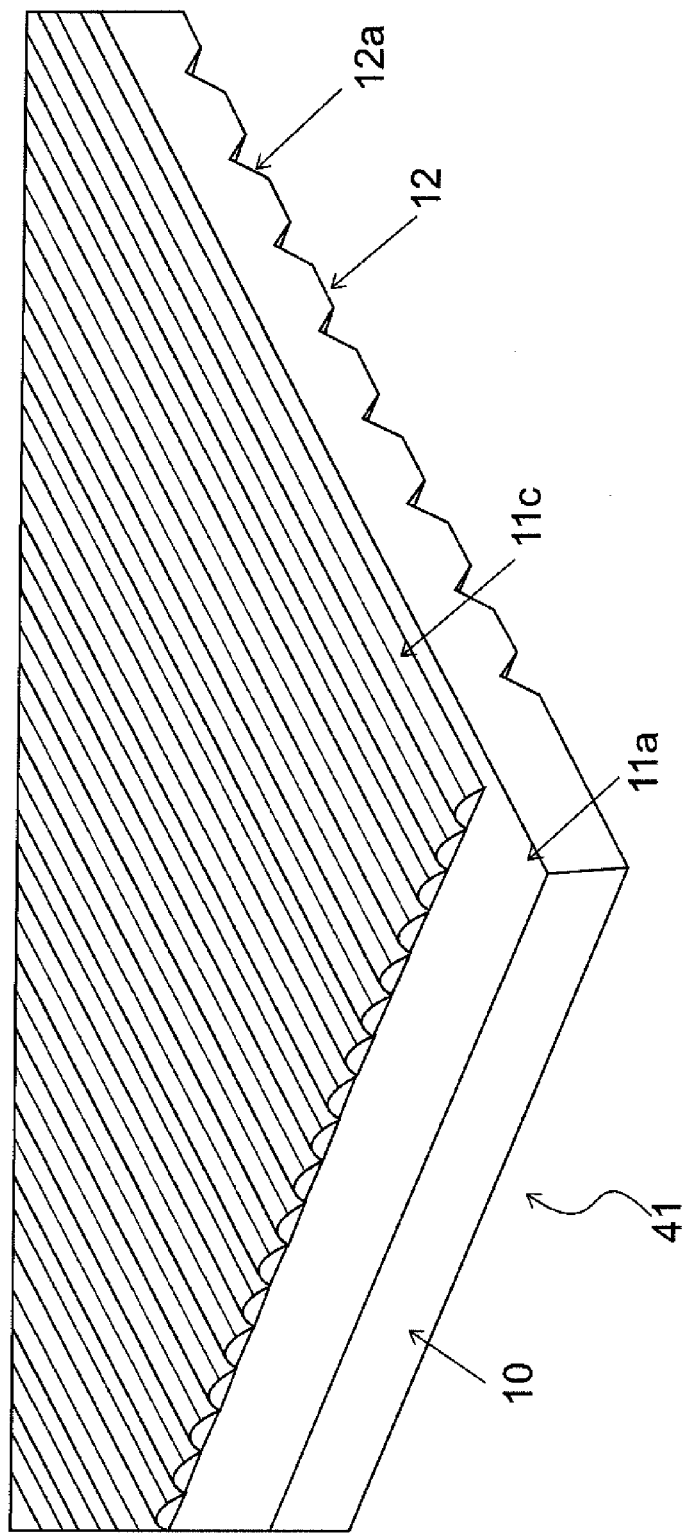
FIG. 28 is a perspective view of a light guide plate according to a modification of Embodiment 1 of the invention.
Figure 29:
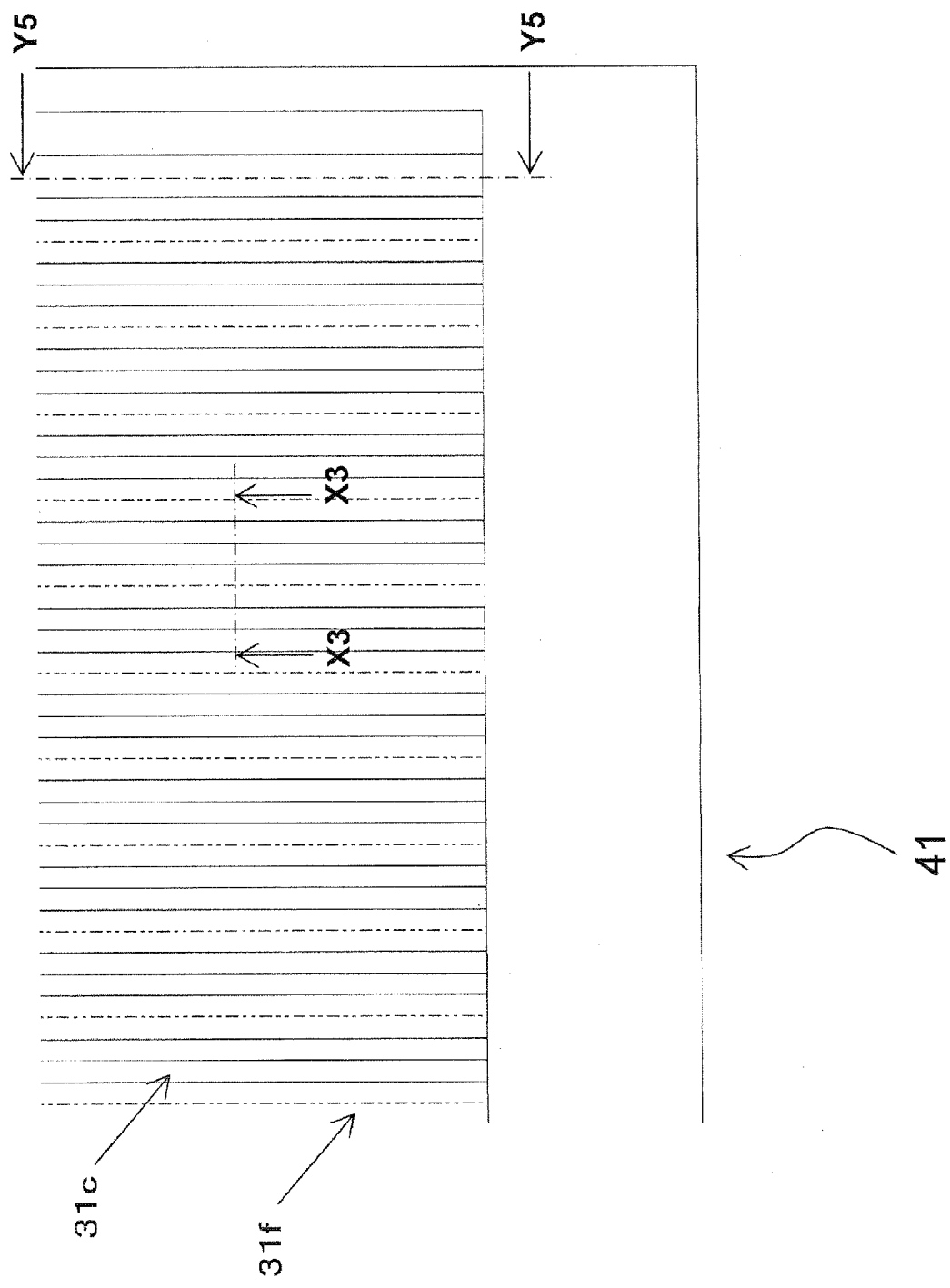
FIG. 29 is a top view of a light guide plate according to a modification of Embodiment 1 of the invention.
Figure 30:
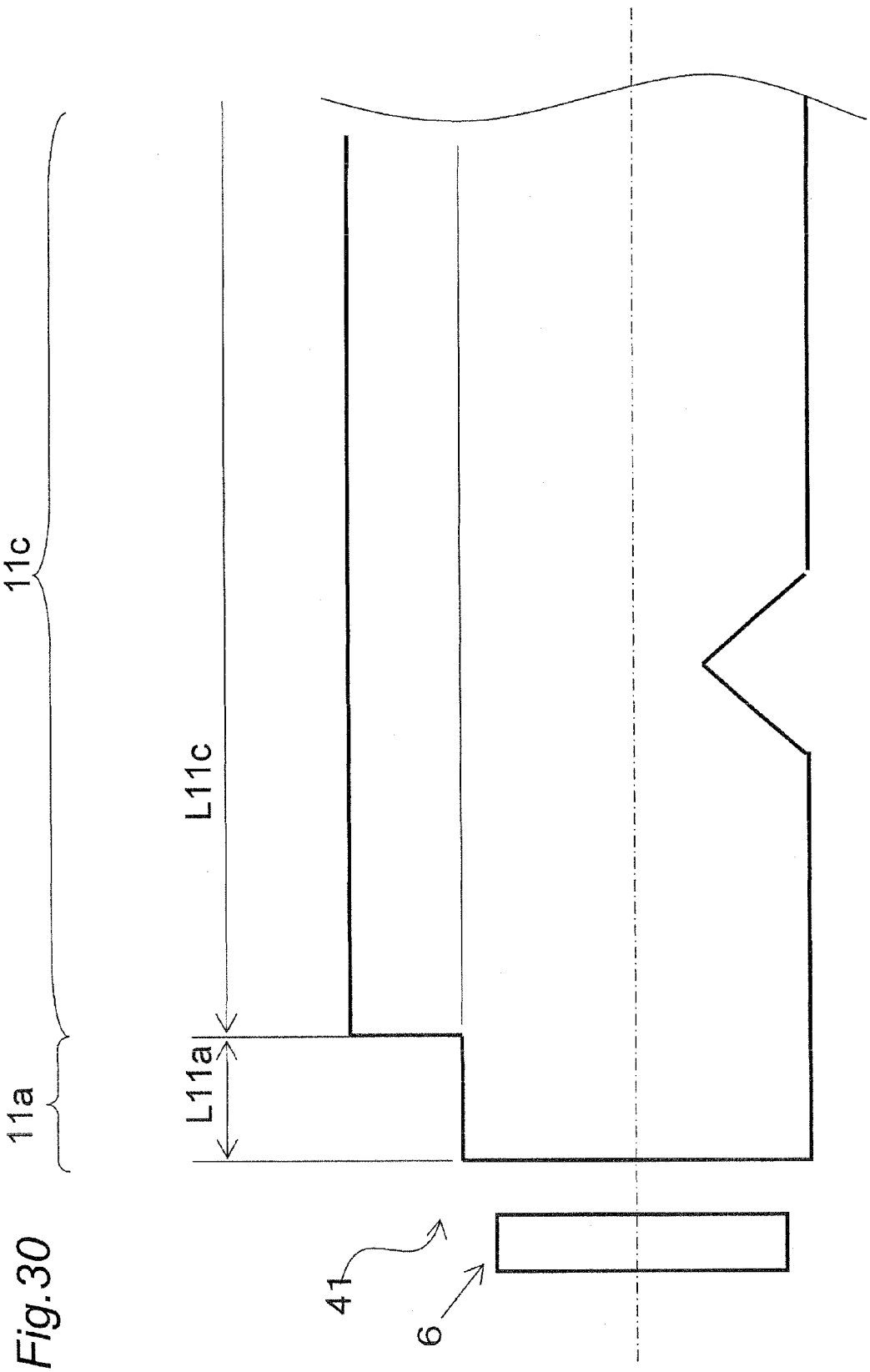
FIG. 30 is a sectional view of the light guide plate, taken along the line Y5-Y5, according to the modification of Embodiment 1 of the invention.

FIGS. 28 and 29 are a perspective view and a top view, respectively, of a light guide plate 41 according to a modification of Embodiment 1 with the diffusion-and-propagation auxiliary region 11*b* eliminated. FIG. 30 is a sectional view of the light guide plate 41 taken along the line Y5-Y5 of FIG. 29. The sectional view of the light guide plate 41 taken along the line X3-X3 of FIG. 29 is similar to FIG. 11 according to Embodiment 1, its description being omitted.

Figure 31:
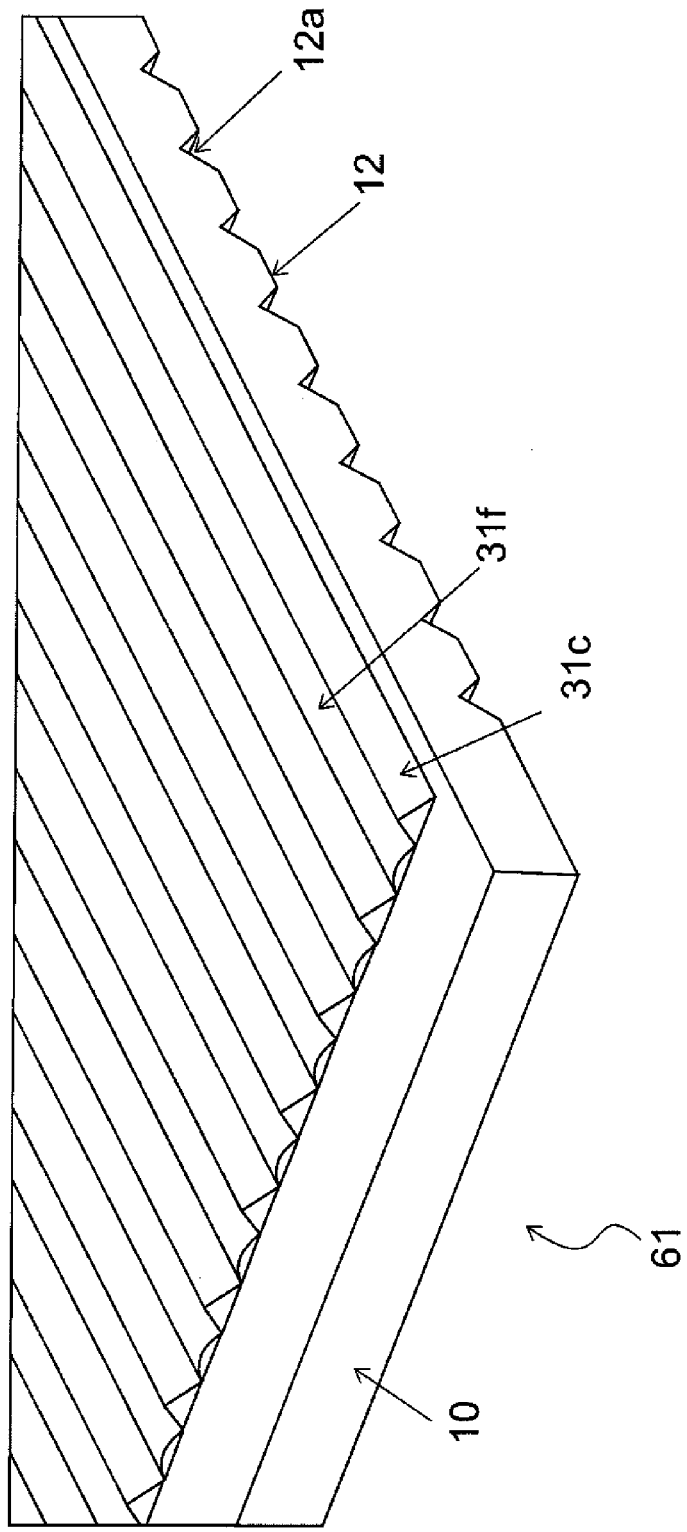
FIG. 31 is a perspective view of a light guide plate according to a modification of Embodiment 2 of the invention.
Figure 32:
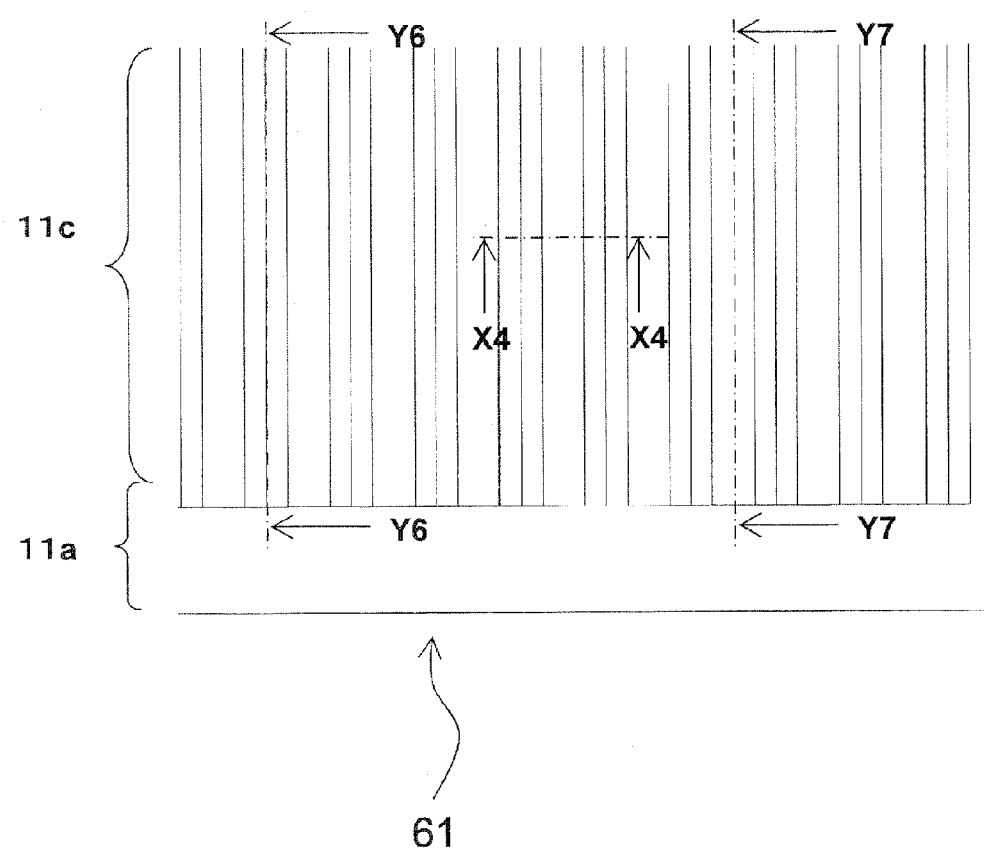
FIG. 32 is a top view of the light guide plate according to the modification of Embodiment 2 of the invention.
Figure 33:
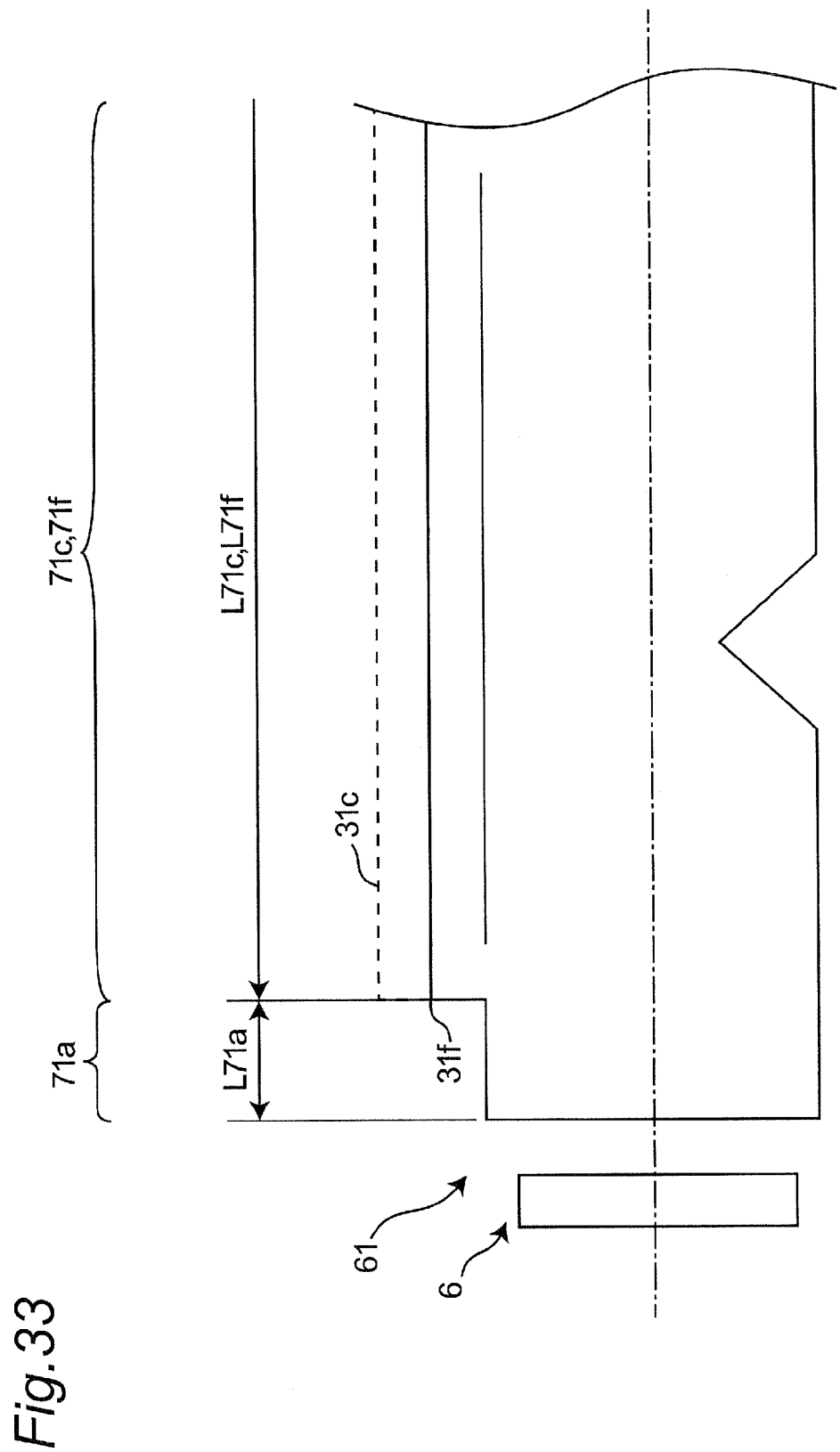
FIG. 33 is a sectional view of the light guide plate, taken along the line Y6-Y6, according to the modification of Embodiment 2 of the invention.
Figure 34:
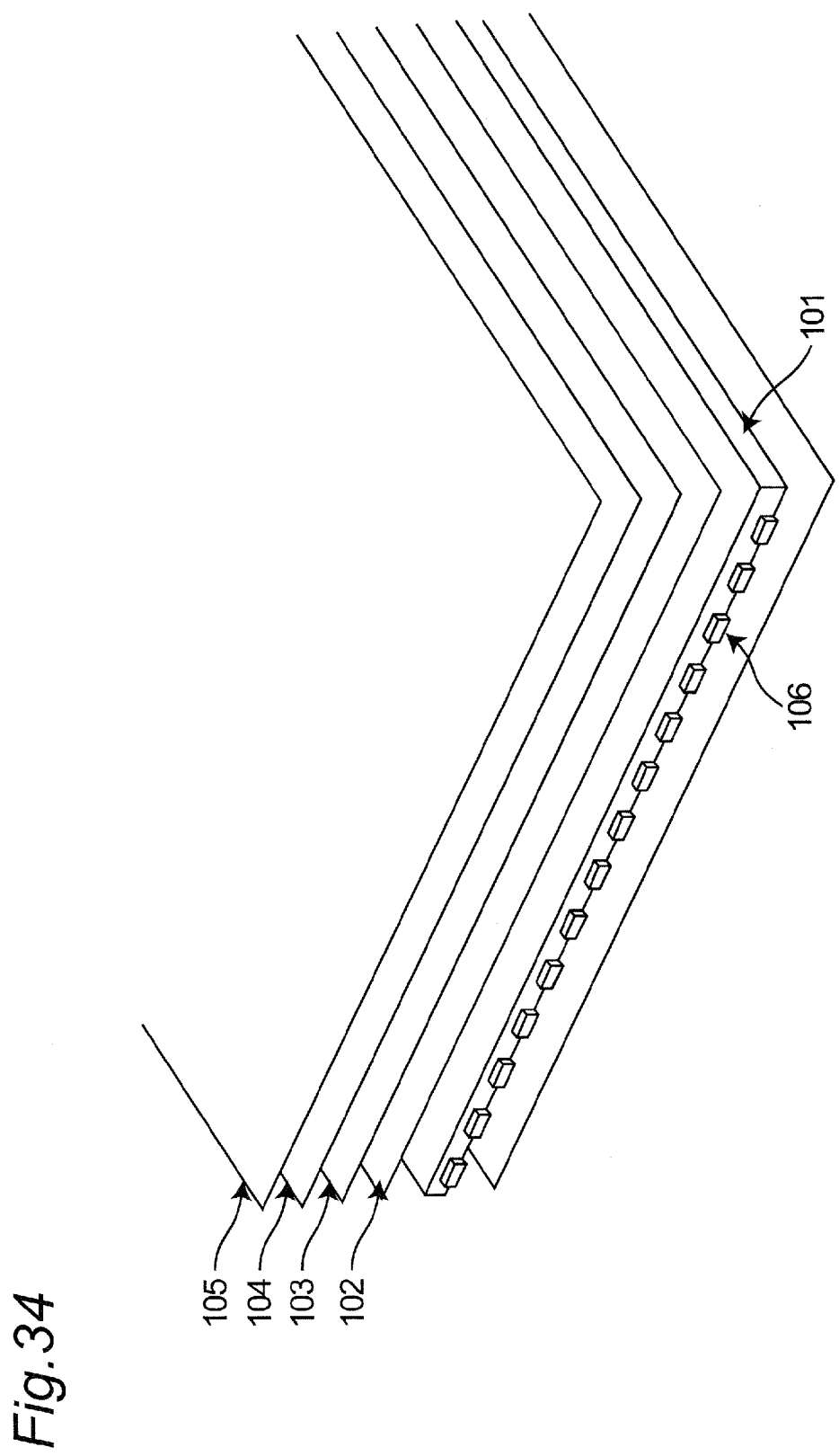
FIG. 34 is a perspective view of an edge-light type backlight unit in which LEDs are adopted.
Figure 35:
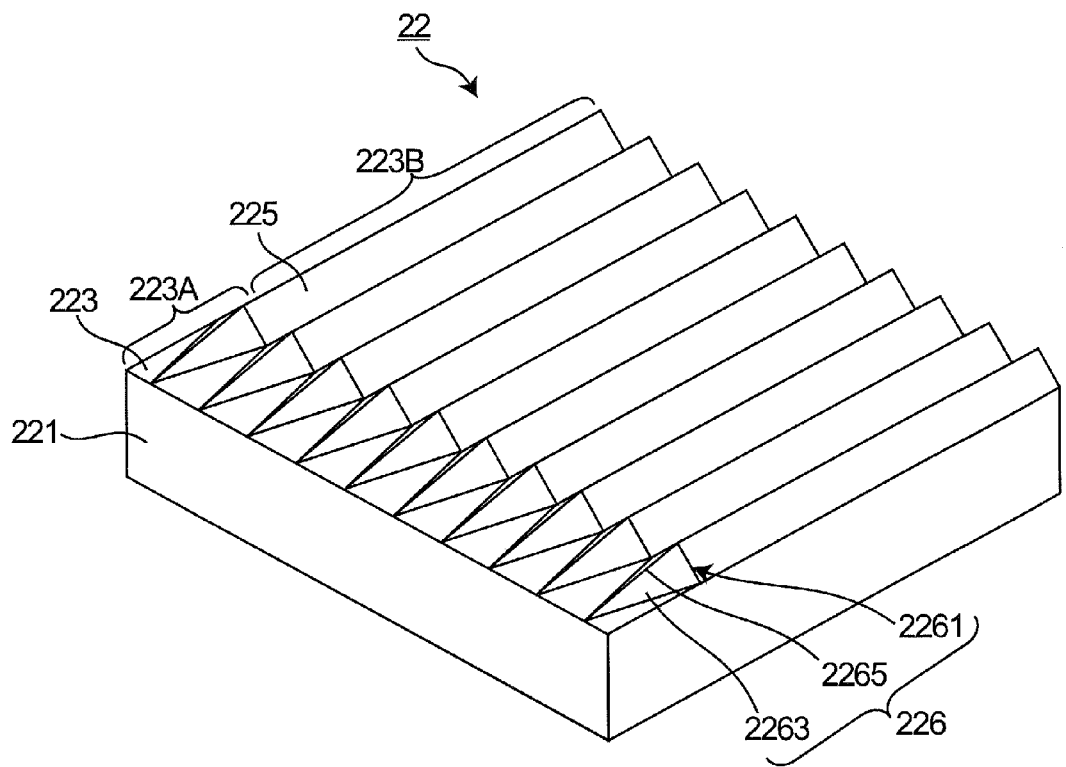
FIG. 35 is a perspective view of a light guide plate according to a prior art.
Figure 36:
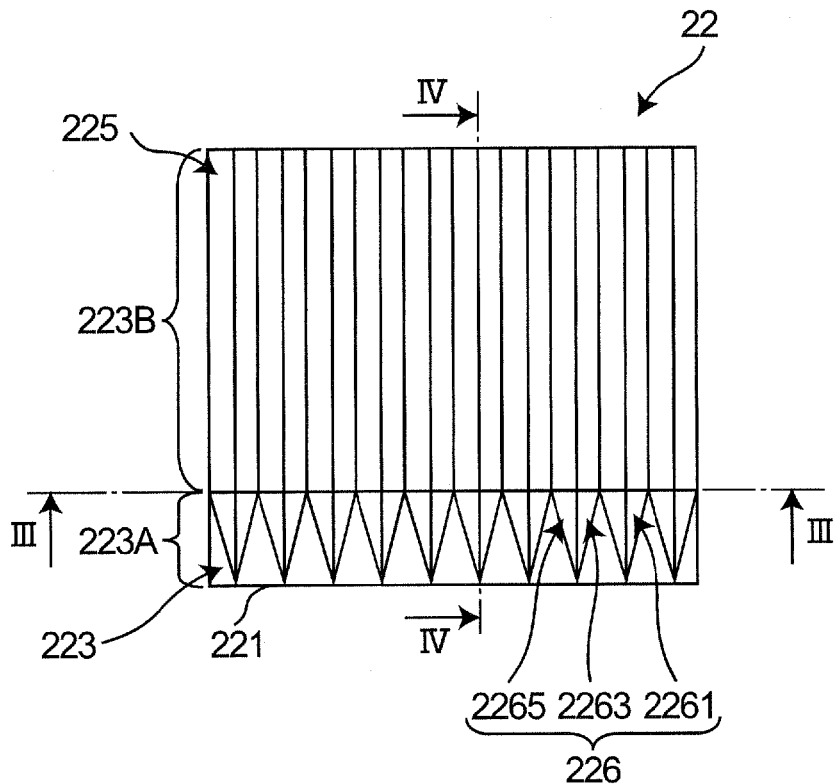
FIG. 36 is a top view of the light guide plate according to the prior art.
Figure 37:
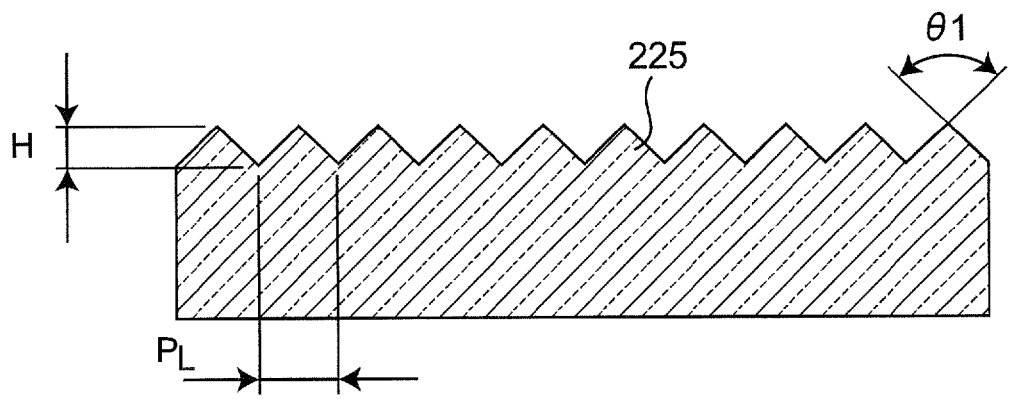
FIG. 37 is a sectional view of the light guide plate according to the prior art.
Figure 38:
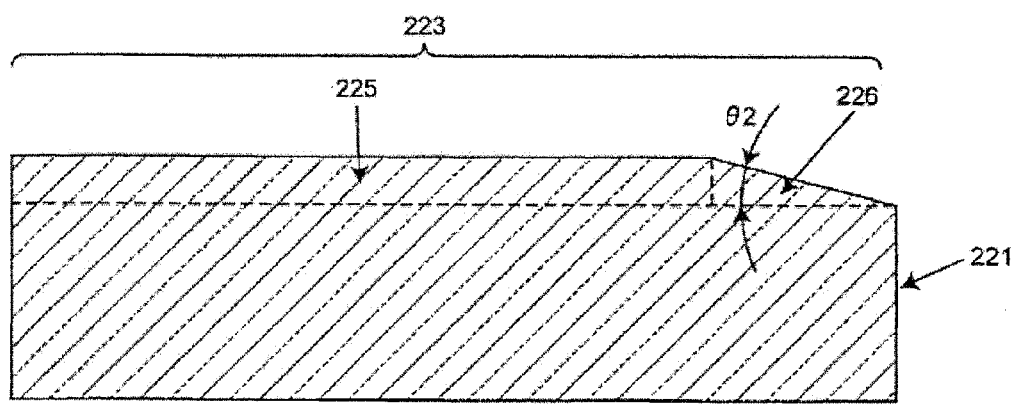
FIG. 38 is a IV-IV sectional view of the light guide plate according to the prior art.

Furthermore, FIGS. 31 and 32 are a perspective view and a top view, respectively, of a light guide plate 61 according to a modification of Embodiment 2 with the diffusion-and-propagation auxiliary region 31*b* eliminated. FIG. 33 is a sectional view of the light guide plate 61 taken along the line Y6-Y6, Y7-Y7 of FIG. 32. The sectional view of the light guide plate 61 taken along the line X4-X4 of FIG. 32 is similar to FIG. 27 according to Embodiment 2, its description being omitted.

The above modifications are similar to Embodiments 1 and 2 except that the diffusion-and-propagation auxiliary regions 11*b*, 31*b* are eliminated, and so detailed description of the individual constituent elements is omitted. The diffusion-and-propagation auxiliary regions 11*b*, 31*b* placed outside the effective light-emission area are small ranges relative to the effective light-emission area, not largely affecting the quality of the light guide plates 1, 21. With the structure in which the diffusion-and-propagation auxiliary regions 11*b*, 31*b* are not formed, it becomes possible to prevent minute losses of light that occur in the diffusion-and-propagation auxiliary regions 11*b*, 31*b*.

Further, the foregoing Embodiments 1 and 2 and their modifications have been described on a case where the upper end of each prism protrusion is formed into a circular-arc shape as viewed in a YZ cross section. However, the case may be another in which the upper end is formed into curved lines including an elliptical shape. Also, the embodiments and modifications have been described on a case where the cross-sectional shape of the prism protrusions in a cross section parallel to the incident surface is V-shaped. However, other various shapes may also be adopted.

Optical paths and scale of individual constituent elements or the like shown in the figures are schematically represented for explanation's sake and do not coincide with actual optical paths, scale or the like.

It is to be noted that, by properly combining the arbitrary embodiments of the aforementioned various embodiments, the effects possessed by them can be produced.

The light guide plate, the backlight unit and the surface light source device according to the embodiments are useful for backlights of liquid crystal televisions, tablet terminal devices, laptop type personal computers or the like, light-emitting devices of illuminating apparatuses, and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2012-141879 filed on Jun. 25, 2012 including specifications, claims, drawings, and abstracts are incorporated herein by reference in its entirety.

What is claimed is:

1. A light guide plate comprising:
    an incident surface on which light outputted from a plurality of point light sources is incident;
    an outgoing surface from which light incident from the incident surface is outputted, the outgoing surface being orthogonal to the incident surface; and
    a reflection-and-propagation surface at which the light incident from the incident surface is reflected so as to be propagated toward the outgoing surface, the reflection-and-propagation surface being opposed to the outgoing surface and being orthogonal to the incident surface, wherein
    a plurality of prism grooves extending parallel to the incident surface are formed in the reflection-and-propagation surface,
    a flat surface portion is formed in a propagation region of the outgoing surface adjacent to the incident surface, and
    a plurality of prism protrusions extending orthogonal to the incident surface are formed in a diffusion-and-propagation region of the outgoing surface adjacent to the propagation region, each of the prism protrusions including a protrusion having a curved portion at its upper end.

2. The light guide plate according to claim 1, wherein the prism protrusions include a first prism protrusion in which an upper end of a protrusion cross section parallel to the incident surface is formed from a curved portion, and a second prism protrusion in which an upper end of a protrusion cross section parallel to the incident surface is formed from a linear portion.

3. The light guide plate according to claim 1, wherein
    a cross section of the prism protrusions parallel to the incident surface is projecting-shaped, and
    a ratio of a length of a linear portion to a length of the curved portion in the projecting shape satisfies a relationship $$0.3 \leq (\text{length of curved portion})/(\text{length of linear portion}) \leq 1.0.$$

4. The light guide plate according to claim 1, wherein height of the prism protrusions formed in the reflection-and-propagation surface keeps constant or continuously increases from the incident surface toward a center of the light guide plate.

5. The light guide plate according to claim 1, wherein each prism ridge of the prism protrusions is formed by a curved line including a straight line.

6. The light guide plate according to claim 1, wherein the prism grooves are formed so as to have a maximum groove depth at a center of the light guide plate and become continuously shallower toward the incident surface among each other.

7. A backlight unit including:
    the light guide plate according to claim 1, and
    a plurality of point light sources.

8. A surface light source device comprising:
the light guide plate according to claim 1;
at least one diffusion sheet;
at least one prism sheet;
a plurality of optical sheets for controlling light derived from the light guide plate;
a reflecting sheet provided on one side of the light guide plate counter to the diffusion sheet and serving for reflecting light toward the outgoing surface; and
an LED.

* * * * *